United States Patent

Johnson et al.

[15] 3,643,243

[45] Feb. 15, 1972

[54] MEMORY SYSTEM HAVING ASSOCIATED PLURAL TIMING TRACKS AND DATA TRACKS

[72] Inventors: Wesley R. Johnson; Jon J. Hamel, both of Minneapolis, Minn.

[73] Assignee: Sperry Rand Corporation, New York, N.Y.

[22] Filed: Nov. 26, 1969

[21] Appl. No.: 880,429

Related U.S. Application Data

[63] Continuation of Ser. No. 597,371, Nov. 28, 1966, abandoned.

[52] U.S. Cl. ....................340/174.1 B, 340/174.1 D

[51] Int. Cl. ....................G11b 15/12, G11b 27/36

[58] Field of Search ..............340/174.1 R, 174.1 B, 174.1 C, 340/174.1 D, 174.1 L; 179/100.2 MI

[56] References Cited

UNITED STATES PATENTS

| | | | |
|---|---|---|---|
| 2,975,407 | 1/1961 | O'Brien | 340/174.1 C |
| 3,147,462 | 9/1964 | Levinson et al. | 340/174.1 C |
| 3,273,120 | 9/1966 | Dustin et al. | 340/174.1 C |
| 3,337,852 | 8/1967 | Lee et al. | 340/174.1 C |
| 3,206,737 | 9/1965 | Lee et al. | 340/174.1 C |

*Primary Examiner*—Terrell W. Fears
*Assistant Examiner*—Vincent P. Canney
*Attorney*—Thomas J. Nikolai, Kenneth T. Grace and John P. Dority

[57] ABSTRACT

A magnetic drum system that incorporates rigid read/write head mountings described as data blocks and spare blocks. Each block includes a timing track head, and an associated group of data track heads which are positioned at associated opposite ends of the block for minimizing skew and crosstalk error. Included is a bad-track memory for electrically switching to a timing track head and an associated group of data track heads in the spare block when a bad-track on the magnetic drum arises under one of the data track heads in the data block.

12 Claims, 32 Drawing Figures

Fig. 14a

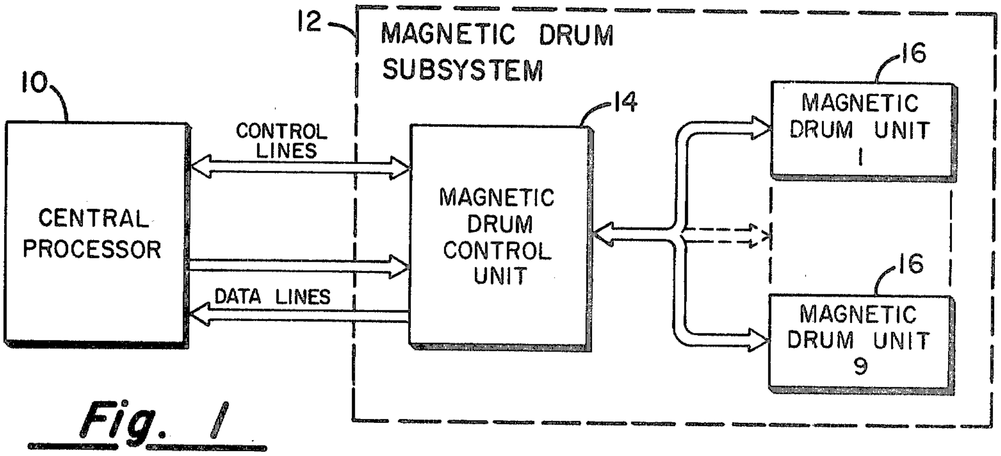

Fig. 1

ANGULAR ADDRESS FORMAT

| AA2 | AA1 |
|---|---|
| $2^{11}$ | $2^{5}$ |
| $2^{10}$ | $2^{4}$ |
| $2^{9}$ | $2^{3}$ |
| $2^{8}$ | $2^{2}$ |
| $2^{7}$ | $2^{1}$ |
| $2^{6}$ | $2^{0}$ |
| DEAD | DEAD |

Fig. 6

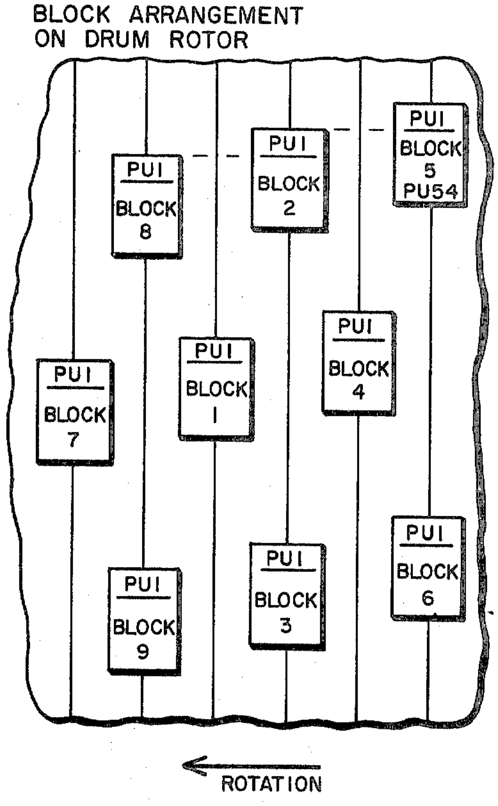

Fig. 2

30-BIT DATA WORD FORMAT

| | | |
|---|---|---|
| $2^{29}$ | $2^{23}$ | $2^{11}$ |
| $2^{28}$ | $2^{22}$ | $2^{10}$ |
| $2^{27}$ | $2^{21}$ | $2^{9}$ |
| $2^{26}$ | $2^{20}$ | $2^{8}$ |
| $2^{25}$ | $2^{19}$ | $2^{7}$ |
| $2^{24}$ | $2^{18}$ | $2^{6}$ |
| — | $2^{17}$ | $2^{5}$ |
| — | $2^{16}$ | $2^{4}$ |
| — | $2^{15}$ | $2^{3}$ |
| — | $2^{14}$ | $2^{2}$ |
| — | $2^{13}$ | $2^{1}$ |
| — | $2^{12}$ | $2^{0}$ |
| PARITY | PARITY | PARITY |
| DEAD | DEAD | DEAD |

Fig. 7

36-BIT DATA WORD FORMAT

| | | |
|---|---|---|
| $2^{35}$ | $2^{23}$ | $2^{11}$ |
| $2^{34}$ | $2^{22}$ | $2^{10}$ |
| $2^{33}$ | $2^{21}$ | $2^{9}$ |
| $2^{32}$ | $2^{20}$ | $2^{8}$ |
| $2^{31}$ | $2^{19}$ | $2^{7}$ |
| $2^{30}$ | $2^{18}$ | $2^{6}$ |
| $2^{29}$ | $2^{17}$ | $2^{5}$ |
| $2^{28}$ | $2^{16}$ | $2^{4}$ |
| $2^{27}$ | $2^{15}$ | $2^{3}$ |
| $2^{26}$ | $2^{14}$ | $2^{2}$ |
| $2^{25}$ | $2^{13}$ | $2^{1}$ |
| $2^{24}$ | $2^{12}$ | $2^{0}$ |
| PARITY | PARITY | PARITY |
| DEAD | DEAD | DEAD |

Fig. 8

INVENTORS
WESLEY R. JOHNSON
JON J. HAMEL
BY Charles A. Johnson
ATTORNEY

TT = TIMING TRACK
DT = DATA TRACK
SP = SPARE TRACK

AA = ANGULAR ADDRESS TRACK
RM = REFERENCE MARK TRACK
SP = SPARE TRACK
TT = TIMING TRACK
WM = WORD MARK TRACK
MT = MASTER TIMING TRACK

FUNCTION WORD FORMAT

| $2^{29}$---$2^{24}$ | $2^{23}$ $2^{22}$ | $2^{21}$------------------------$2^{0}$ |
|---|---|---|
| FUNCTION CODE | NOT USED | DRUM ADDRESS |

DRUM ADDRESS FORMAT

| $2^{21}$---$2^{18}$ | $2^{17}$---$2^{11}$ | $2^{10}$------------$2^{0}$ |
|---|---|---|
| DRUM 0-8 | CHANNEL 0-127 | ANGULAR ADDRESS 0-2047 |

OVERFLOW WORD FORMAT

| $2^{29}$---$2^{24}$ | $2^{23}$------------------------$2^{0}$ |
|---|---|
| 04 | CONTENTS OF ADDRESS FOLLOWING EOB WORD |

STATUS WORD FORMAT

| $2^{29}$---$2^{24}$ | $2^{23}$ $2^{22}$ | $2^{21}$------------------------$2^{0}$ |
|---|---|---|
| STATUS CODE | NOT USED | MAY CONTAIN A DRUM ADDRESS |

| A | B | C |
|---|---|---|
| 0 | 0 | 1 |
| 0 | 1 | 0 |
| 1 | 0 | 0 |
| 1 | 1 | 0 |

POSITIVE OR INVERTER

= −4.5V = "0" = NEGATIVE

= GD = "1" = POSITIVE

| A | B | C |
|---|---|---|
| 0 | 0 | 1 |
| 0 | 1 | 1 |
| 1 | 0 | 1 |
| 1 | 1 | 0 |

POSITIVE AND INVERTER

SPARE DATA HEADS PU23 - PU52 GROUPING
SPARE BLOCK I

PATENTED FEB 15 1972 3,643,243

SHEET 13 OF 16

MEMORY SYSTEM HAVING ASSOCIATED PLURAL TIMING TRACKS AND DATA TRACKS

CROSS-REFERENCE TO RELATED APPLICATION

The present application is a continuation application of our parent application Ser. No. 597,371, filed Nov. 28, 1966 now abandoned.

The present invention relates in its preferred embodiment to a binary recording memory system employing a magnetic drum for data storage. Such drums are normally coated with a magnetizable material for forming a magnetizable memory recording surface thereon. A plurality of transducers, or read/write heads, are inductively associated with said recording surface for reading from and writing into the magnetizable material in the binary number system. In such binary number system, data is recorded as a digital "1" or "0," which "1"'s or "0"'s are distinguished by the relative direction of magnetization of discrete spots, or bits, on the recording surface. Such bits are read from or written onto the recording surface while such recording surfaces passes under an associated head. This recorded data is read from or written onto the recording surface in coordination with a clocking signal that is derived from a timing track that is recorded on the recording surface. The timing track produces a series of timing pulses, or a clocking signal, that times the reading or the writing of the associated data on the recording surface as groups of "1"'s or "0"'s.

Dynamic memory systems utilizing magnetizable memory-recording surfaces are subject to two primary sources of error in the reading and writing operation; skew and crosstalk. Skew is induced in the dynamic memory system when parallel bits on the recording surface are displaced or skewed, out of time alignment with the associated heads. Crosstalk is introduced in the dynamic memory system when magnetic flux from a head crosses over to an adjoining head interfering with the reading or writing operation. As skew is primarily a condition of physical displacement of the associated heads with respect to the recording surface, prior art solutions have been directed toward strengthening the recording surface and the associated heads. Further, as skew is normally a linear function of the displacement of the bits on the recording surface from a line along the recording surface that is normal to the associated heads, the maximum distance between the associated heads in the same block has been reduced to reduce skew error while thus providing higher track densities. However, as crosstalk is a function of the associated head density, such increased head densities have increased the crosstalk error. Flux shielding of adjacent heads, although expensive, is often utilized to reduce this crosstalk error. It is thus apparent that the requirements for minimum skew and crosstalk error are generally considered to be mutually exclusive; high head density tends to decrease skew error but increase crosstalk error while low head density tends to decrease crosstalk error but increase skew error. Accordingly, it is desirable to achieve a practical accommodation of the most desirable features of such a system; maximum head density and minimum system error with optimum economy.

As is well known, cylindrical dynamic magnetizable recording surfaces acquire, during manufacture or after extended use, areas that are incapable of effectively storing digital data; such areas are defined as "bad-spots." As each read/write head passes over the recording surface of the magnetic drum, it defines an associated track (a track is a closed loop of magnetizable material around the periphery or the circumference of the drum that passes under the inductively associated read/write head). A bad-spot effectively removes the entire track that includes one such bad-spot from use as a memory area, i.e., is a defective track. Accordingly, it is desirable, and it is prior art practice, to provide spare tracks that may be used to replace such defective bad-tracks. Applicants' invention provides a dynamic memory system that permits the use of spare data track heads in an associated data block or in an associated spare block while providing minimum separation between the spare data track heads and the associated timing track head.

SUMMARY OF THE INVENTION

The present invention includes several features to reduce skew and crosstalk errors. Skew error is minimized by minimizing the distance on the recording surface between the associated track positions, as defined by the associated head locations of all associated heads; i.e., all heads that are activated during one clock time. Accordingly, it is desirable to group, as closely packed as is possible, the associated timing track head and data track heads in one integral head block. Since crosstalk is normally minimized by maximizing the distance between associated heads, it is desirable that adjacent heads not be used as associated heads. That is, adjacent heads in the same head block are not utilized during the same clock time for the read or write operation. Applcants' dynamic memory system utilizes a head mounting described as a data block in which are incorporated a plurality of aligned read/write heads. Each data block includes a first and a second timing track head, first and second groups of data track heads, and a group of spare track heads. The first and second timing track heads are positioned at associated opposite ends of the data block, the first and second groups of data track heads are positioned adjacent the second and first timing track heads, respectively, and the group of spare track heads is positioned intermediate the first and second groups of data track heads. Thus, there is achieved a rigid coupling of the two associated sets of heads, each set including a timing track head and the associated data track heads. These sets are interleaved with a group of spare track heads to accommodate any "bad-tracks" that may arise, whereby if a bad-track exists under the data track heads such bad-track may be replaced by any other track in the group of spare track heads while still providing the desired relationship with the associated timing track head. Further, applicants provide a spare block, similar in construction to the data blocks. This spare block includes a set of associated heads which set includes a timing track head and an associated group of spare track heads. If for any reason, such as a defective track under a data block, it is desired to use spare track heads other than those spare track heads associated with the selected data block, the spare track heads and the associated timing track head of the spare block may be substituted therefore. Thus, by providing a spare timing track head in the spare block the desired relationship of the associated spare timing track head and group of data track heads may be retained.

Accordingly, it is a primary object of the present invention to provide an improved dynamic system having reduced skew and crosstalk errors.

It is further object of the present invention to provide a dynamic memory system that utilizes a plurality of data blocks, each data block having two sets of heads, each set including a timing track head and a group of associated data track heads, plus a group of spare track heads. Such timing track heads, data track heads, and spare track heads are interleaved to provide maximum track density with maximum associated track separation.

It is a still further object of the present invention to provide a dynamic memory system utilizing a plurality of blocks wherein each block includes a timing track head and an associated group of data track heads.

These and other more detailed and specific objectives will be disclosed in the course of the following specification, reference being had to the accompanying drawings.

BRIEF DESCRIPTION OF THE DRAWINGS

FIG. 1 is a block diagram of a dynamic memory system incorporating the present invention;

FIG. 2 is an illustration of the layout of blocks 1–9 on the drum rotor of a magnetic drum unit of FIG. 1;

FIg. 6 is an illustration of the layout of the angular address format on the drum rotor;

FIG. 7 is an illustration of the layout of the 30-bit data word format on the drum rotor;

FIG. 8 is an illustration of the layout of the 36-bit data word format on the drum rotor;

Figures 9, 10, 11, 12, 24:
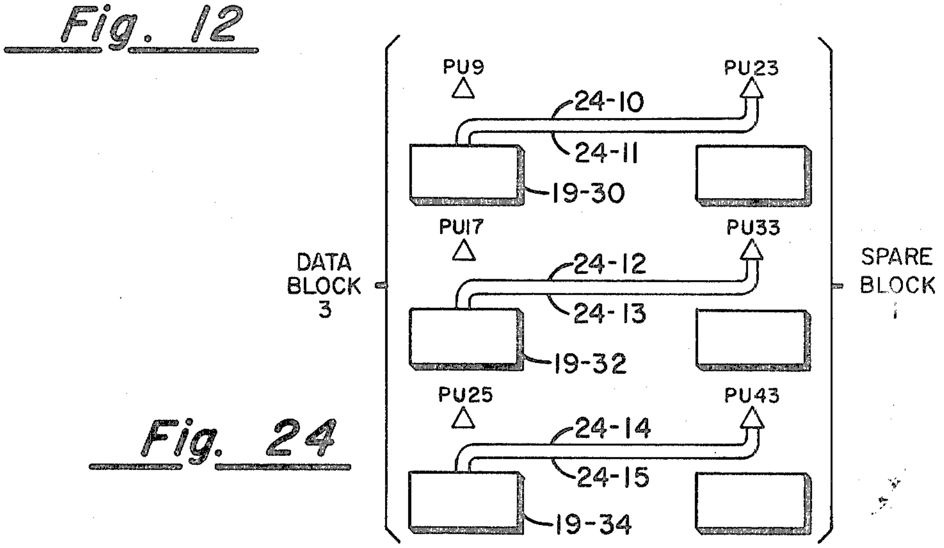
FIG. 9 is an illustration of the function word format.
FIG. 10 is an illustration of the drum address format.
FIG. 11 is an illustration of the overflow word format.
FIG. 12 is an illustration of the status word format.
Figure 23:
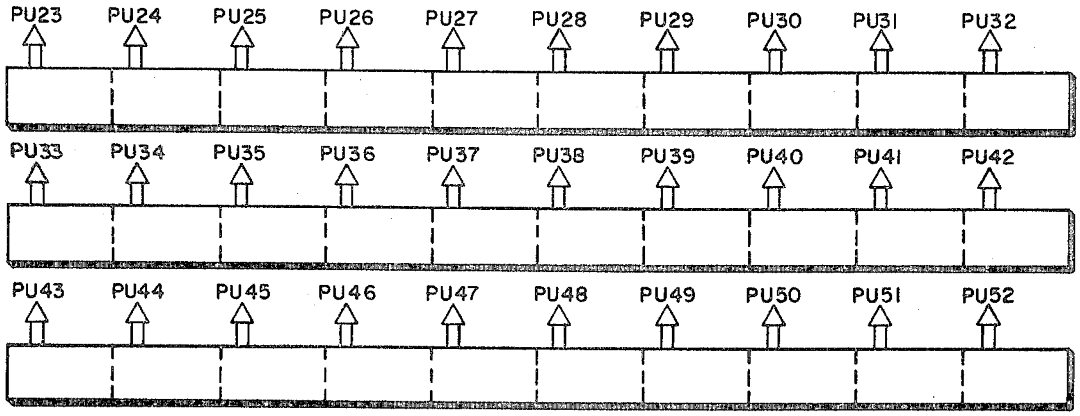
Figure 20:
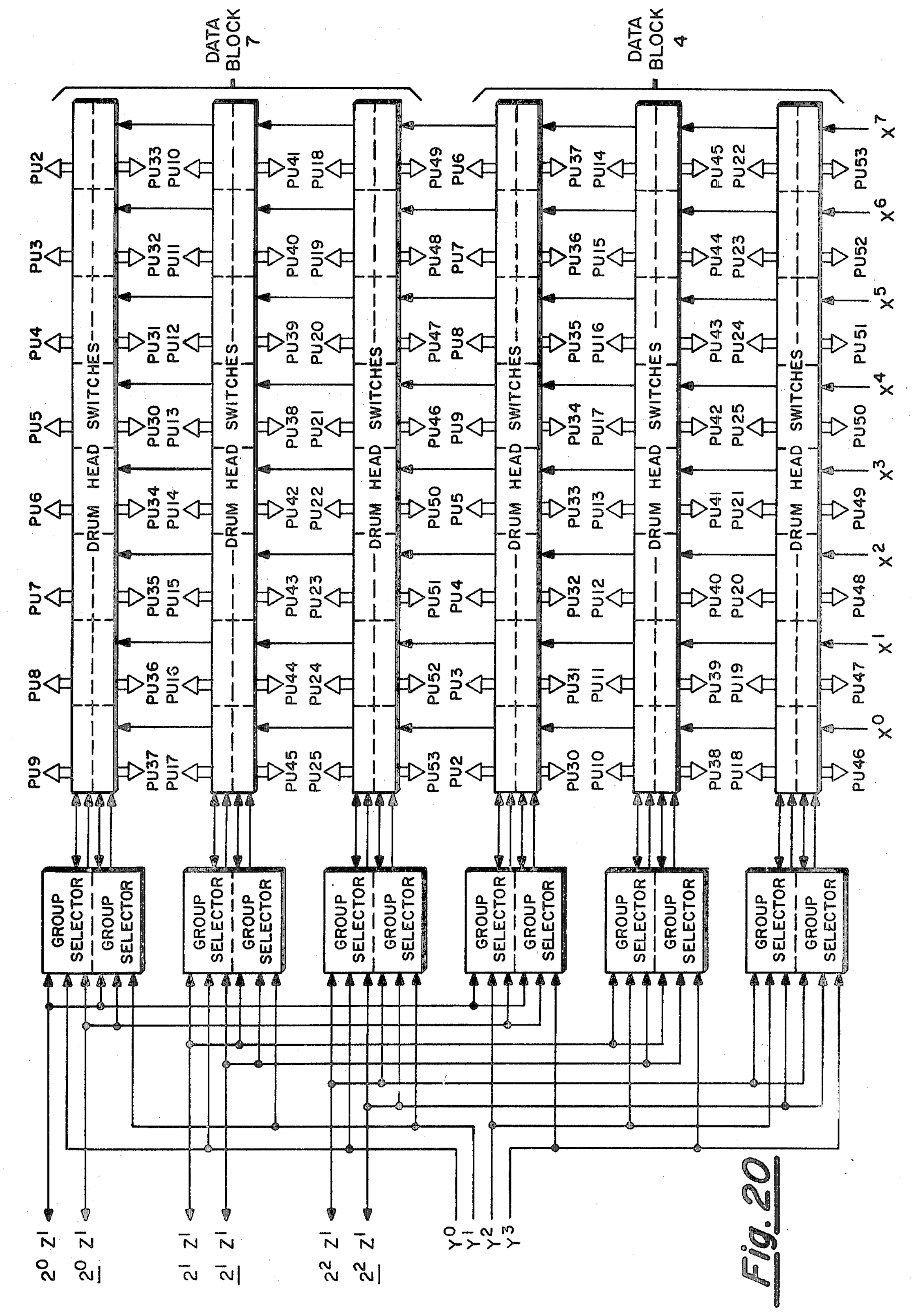
Figure 21:
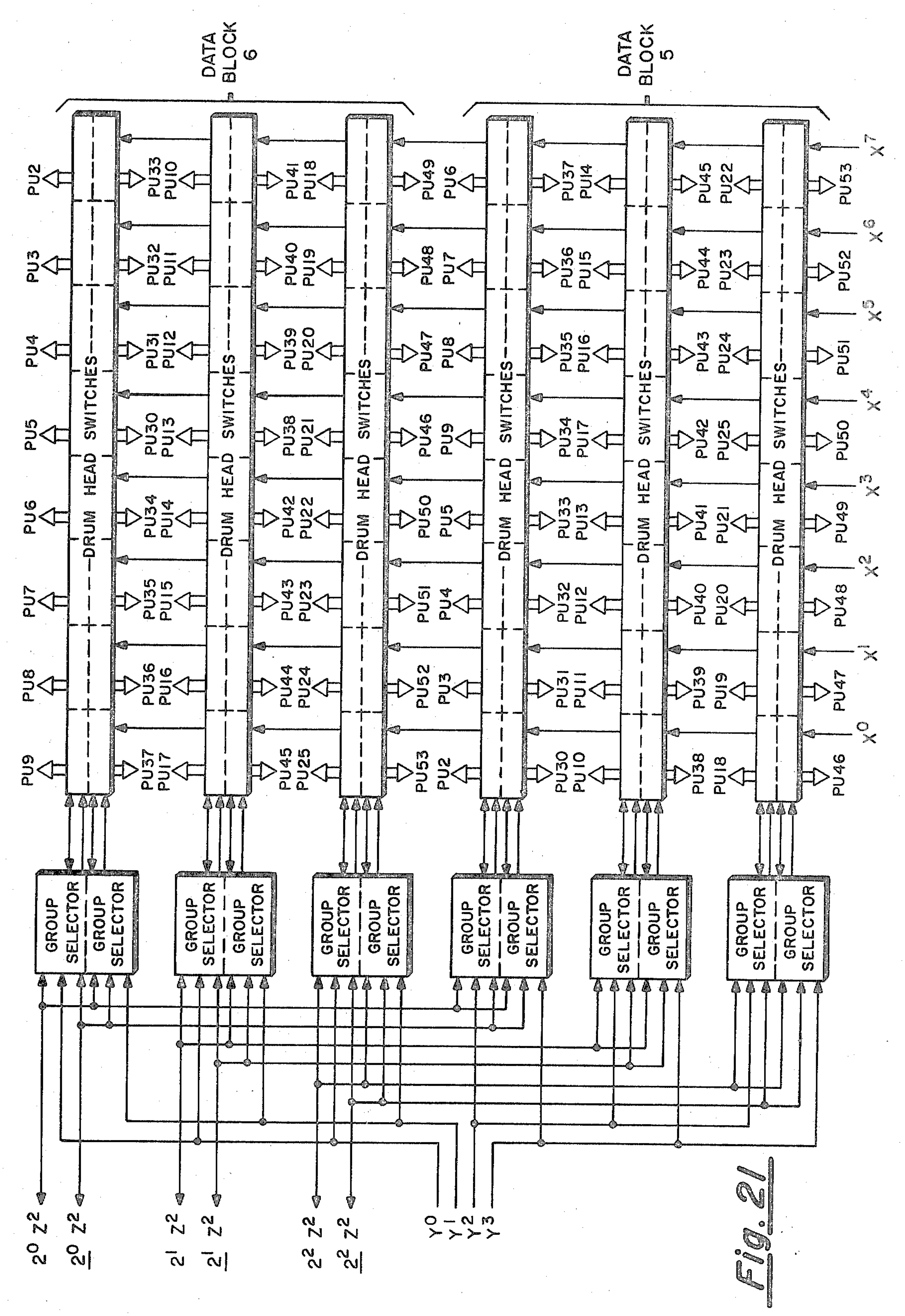
Figure 22:
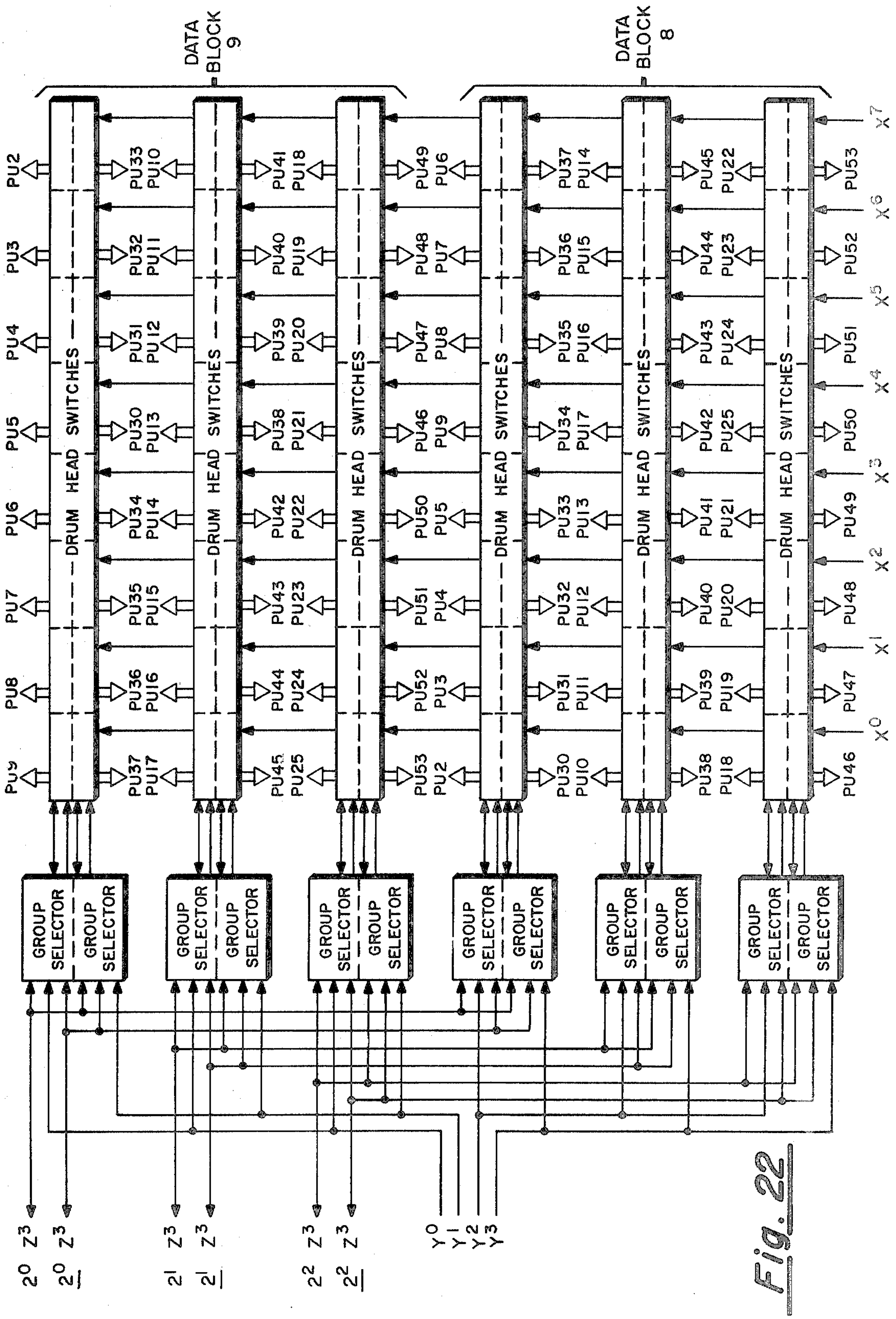

FIG. !9 is an illustration of the $Z^0$ data block 2 and 3 data head selecting matrix;

FIG. 20 is an illustration of the $Z^1$data block 7 and 4 data head selection matrix;

FIG. 21 is an illustration of the $Z^2$ data block 6 and 5 data head selection matrix;

FIG. 22 is an illustration of the $Z^3$ data block 9 and 8 data head selection matrix;

FIG. 23 is an illustration of the grouping arrangement of spare data heads PU23–PU52 of spare block 1;

FIG. 24 is an illustration of the rewiring required to couple spare heads PU23, PU33 and PU43 of spare block 1 to the drum head switches 19–30, 19–32, and 19–34 of data block 3.

DESCRIPTION OF THE PREFERRED EMBODIMENT

The illustrated embodiment of FIG. 1 includes a Central Processor 10 and a Magnetic Drum Subsystem 12. Central Processor 10 is a means whereby programmable control signals are originated and transmitted to Magnetic Drum Subsystem 12 which subsystem interprets the received control signals to implement data transfer therebetween. In order that the present invention is to be understandable, it is illustrated as being incorporated in the environment of FIG. 1 although no limitation thereto is intended. Further, although Central Processor 10 is discussed superficially below it is to be understood that it is not a necessary element of the present invention, for the necessary control signals and data signals may be provided by any suitable means. However, to realize the optimum benefit of the present invention, the illustrated embodiment of FIG. 1 is presented for the purpose of discussing the preferred embodiment of the present invention. Operation of the electronic data processing system of FIG. 1 is with respect to the Central Processor 10; an output operation is information transfer from the Central Processor 10 to the Magnetic Drum Subsystem 12, while an input operation is information transfer from the Magnetic Drum Subsystem 12 to the Central Processor 10.

The illustrated embodiment of FIG. 1 is a block diagram of an electronic data processing system in which the concept of the present invention may be incorporated. This system includes Central Processor 10, Magnetic Drum Control Unit 14 and a plurality of from one to nine similar Magnetic Drum Units all designated by the similar reference number 16. Although the illustrated embodiment of FIG. 1 is directed toward an environment of a Central Processor controlling a plurality of Magnetic Drum Units the concept of the present invention is not to be limited thereto. The basic environment for the most efficient utilization of the concept of the present invention is with a high-speed, programmable device such as a stored-program computer having random-access memory or a plugboard-programmed data analyzer, or the like, which, through the use of coded instructions, directs the control of a dynamic memory system utilizing a plurality of magnetic read/write transducers that are inductively coupled to a dynamic magnetizable recording surface. Although the Central Processor 10 utilized in the illustrated embodiment is a high-speed, random-access memory, stored-program computer, it is to be understood that any programmable device may be utilized. Magnetic Drum Control Unit 14 provides Central Processor 10 with access to and control of a plurality of Magnetic Drum Units 16. The Magnetic Drum Control Unit 14 converts the 30-bit Central Processor digital data words into a form acceptable to the Magnetic Drum System 12 and interprets the instructions issued by the Central Processor instruction words. Magnetic Drum Control Unit 14 also provides the capability of notifying the Central Processor 10 of certain specified occurrences that affect system operation.

The illustrated embodiment of FIG. 1 of the present invention utilizes a general purpose digital computer which will be termed a "Central Processor." This Central Processor emphasizes rapid communication with external devices and implies a large, random-access, internal memory and is of the stored program type, That is, once the program of instructions is written and coded in a form acceptable to the Central Processor, it is entered into the memory, or storage, section of the Central Processor. From this point on the Central Processor, upon proper initiation, will execute the series of instructions that make up the stored program, and thereby performs its intended function. Single address instructions are applied at an average execution time of 20 microseconds ($\mu$s.). These instruction words are the same number of bits in length (30 binary digits) as are the words that are utilized in the memory registers of the Central Processor. Each memory section register is selectably addressed either as a single 30-bit word or as two independent 15-bit words. The Central Processor uses the parallel binary mode in the performance of arithmetic and logical operations using a one's complement subtractive arithmetic system of modulus $2^{30}-1$. Such a Central Processor may be of the same type as more fully described in the C. W. Ehrman et al., U.S. Pat. No. 3,243,781 and R. L. Burkholder et al., U.S. Pat. No. 3,251,040, and, accordingly, no detailed discussion thereof shall be provided herein. The operation of such Central Processor as a means for controlling peripheral equipment coupled thereto with respect to the control of a magnetic tape subsystem, is disclosed in the copending patent application of M. L. Hanson et al., Ser. No. 280,878 filed May 16, 1963, now U.S. Pat. No. 3,343,132 and with respect to a control of a magnetic drum subsystem, is disclosed in the copending application of A. R. Talarczyk, Ser. No. 478,885, filed Aug. 11, 1965, now U.S. Pat. No. 3,355,718 both assigned to the Sperry Rand Corporation as is the present application.

The Magnetic Drum Subsystem 12 of FIG. 1 includes the Magnetic Drum Control Unit 14 and from one to nine Magnetic Drum Units 16 and is an input/output device capable of reading or writing data, in the form of magnetically polarized areas, on the magnetizable recording surface of a drum rotor. A binary "1" is represented by a first magnetic polarity and a binary "0" is represented by an opposite polarity. For purposes of simplifying the control circuitry and presenting a more readily understandable presentation of a concept of the present invention, only one Magnetic Drum Unit will be utilized in the discussion of the illustrated embodiment. The Magnetic Drum Control Unit receives control signals from the Central Processor, decodes the signals into commands that select a specified Magnetic Drum Unit and conditions that selected Magnetic Drum Unit to write data on or read data from the magnetizable recording surface thereof. The Magnetic Drum Control Unit also performs various checks, and should an error occur, notifies the Central Processor of the occurrence and nature of the error.

The Magnetic Drum Unit 16 is an electromechanical multiple-track flying-head device that provides large-capacity storage with fast access. Binary data is read from or written on 384 data tracks around the magnetizable recording surface periphery of the drum rotor at a recording density of approximately 889 bits per inch with an average access time of 4.3 milliseconds (m-secs). Data is recorded in three-bit parallel groups of three parallel data tracks forming a data channel of three tracks with each channel having a capacity of 2,048 36-bit words. Parallel serial-mode recording is utilized with each word occupying 14 successive bit positions along the associated channel: bit positions 1–12 are utilized for data word storage; bit position 13 is utilized for parity storage; and, bit position 14 is unrecorded and is utilized as a "dead space." At the end of each channel an additional "dead space" provides sufficient time for transients to decay when switching from channel to channel. The time interval provided by the dead space is sufficiently long to permit all the associated circuitry to stabilize in time to read or write the next successive address without missing a drum revolution.

Each Magnetic Drum Unit 16 has associated therewith nine read/write head blocks, comprised of eight data blocks and one spare block, arranged around the recording surface of the drum rotor as illustrated in FIG. 2. All blocks 1–9 have 54 read/write heads, or pickup transducers, PU1–PU54, aligned along the longitudinal axis of the drum with the heads of each parallel group of blocks, such as blocks 8, 2, and 5, displaced one track width along the drum's longitudinal axis. This arrangement permits adjoining heads of a block to be displaced two track widths.

Figure 3:
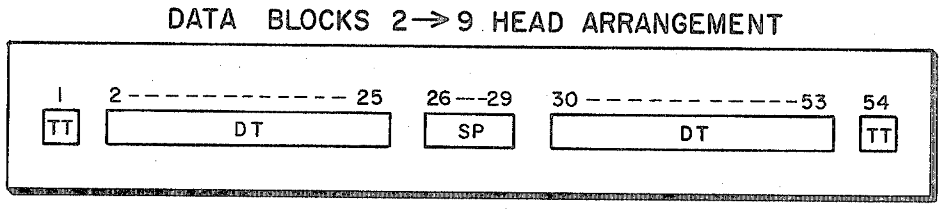
FIG. 3 is an illustration of the layout of the head arrangement in data blocks 2–9.

The data blocks, blocks 2–9, have a head arrangement as illustrated in FIG. 3. Each data block includes a first and a second timing track head, bits 1 and 54, first and second groups of data track heads, bits 30–53 and bits 2–25, and a group of spare track heads, bits 26–29. The first and second timing track heads are positioned at associated opposite ends of the data block, the first and second groups of data track heads are positioned adjacent the second and first timing track heads, respectively, and the group of spare track heads is positioned intermediate the first and second groups of data track heads.

Figure 4:
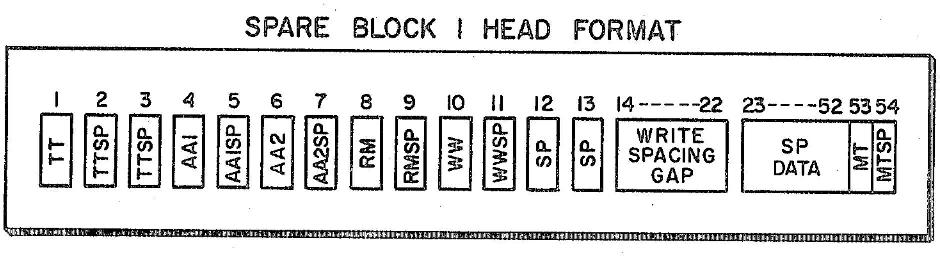
FIG. 4 is an illustration of the layout of the head arrangement in spare block 1.

With particular reference to FIG. 4 there is illustrated the head arrangement of the spare block, designated block 1. The spare block, in addition to providing space for spare data recording when required by more bad tracks that can be accommodated by the spare heads in the associated data block, includes six control track defining heads and certain associated spare heads. These tracks, Master Timing track, Word Mark track, Timing Track, Reference Mark track and two Angular Address tracks are recorded at the time of manufacture of Drum Unit 16 and are not altered during normal subsystem operation.

Figure 5:
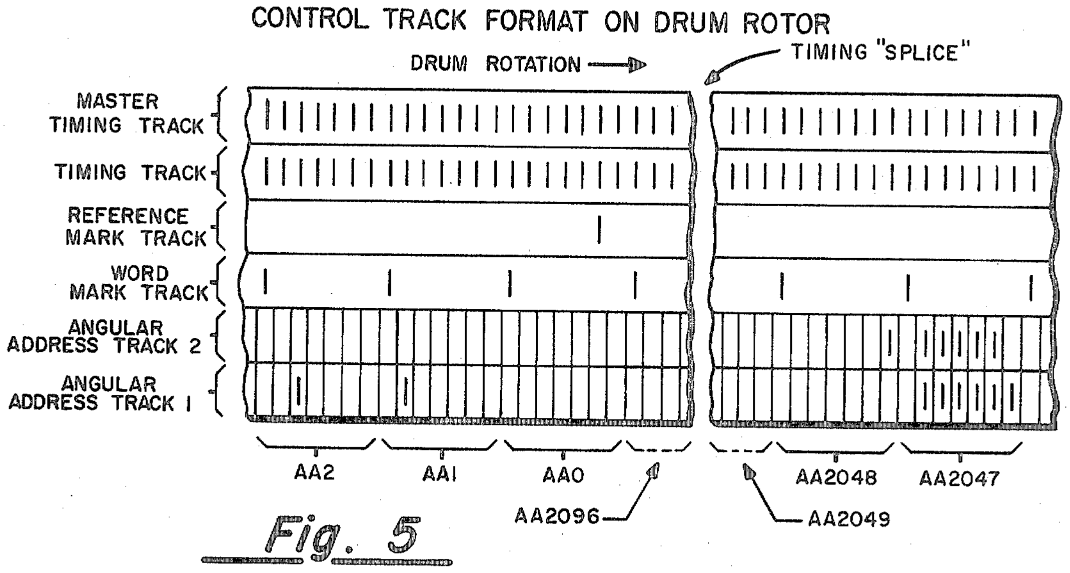
FIG. 5 is an illustration of the layout of the control track format on the drum rotor.

With particular reference to FIG. 5 there is provided a diagrammatic illustration of the format of the six tracks associated with the six control track defining heads of spare block 1, for controlling the flow of data between a Drum Unit 16 and Drum Control Unit 14. The timing track contains 14,679 pulses written around the periphery of the drum with a "timing slice" provided between the 1,479th pulse and the first pulse so as to accommodate slight variations in the circumferential dimension of the drum rotor. With a rotor speed of 7,100 revolutions per minute r.p.m. such timing track provides a timing, or clocking, signal of a frequency of 1.74 megacycles (mc.) which after readout is electronically doubled to provide the operating clocking frequency of 3.48 mc. The master timing track is of a format similar to that of the timing track and is utilized to provide a means for the regeneration of the other track formats of FIG. 5. Both the timing track and master timing track may be considered to be closed tracks in which a "1" is recorded in each succeeding cell around the periphery of the drum rotor providing effectively continuous pulses therefrom.

Each Angular Address occupies 12 bit positions ($2^0$–$2^{11}$) on address tracks AA1 and AA2 having a format as illustrated in FIG. 6. This recorded Angular Address is in a conventional manner wherein a recorded bit represents a "1" and no recorded bit represents a "0," the 12 bit positions provide 2,048 Angular Addresses (0–2,047) along the periphery of the drum wherein each Angular Address designates a data storage location on a segment of one of the three parallel track formed channels. Although the dimensions of the particular drum rotor utilized in the illustrated embodiment accommodates 2,096 Angular Addresses around the periphery of the magnetic drum as defined by Angular Address tracks AA1 and AA2, only 2,048 Angular Addresses are utilized; the additional 49 Angular Addresses are not utilized and are considered to be dead address locations. The word mark track consists of a plurality of word marks; one word mark opposite each of the dead spaces that separate each of Angular Addresses 0–2,048. (See FIG. 5). Each word mark upon readout indicates the beginning of each word of data that is associated with the associated Angular Address.

With particular reference to FIG. 7 there is illustrated the format of the data as recorded by the present system. Although data format as illustrated in FIG. 7 is of a sufficient capacity to permit the use of 36-bit words, the system as illustrated in the preferred embodiment of the present invention utilizes words of 30 bits in length. Accordingly, only data bits $2^{29}$–$2^0$ are utilized, with the unused cells having a "1" recorded therein. Although not pertinent to the present invention, such unused cells are filled with "1"'s so as to accommodate the programming system thereby an End-of-Block word is identified by all of the cells of the data word comprising "1"'s. With particular reference to FIG. 8 there is illustrated the data format to be utilized in a system utilizing 36-bit words wherein bits $2^{35}$–$2^0$ are utilized. As stated above, data transfer, both read and write, is in three-bit parallel groups, 12 three-bit parallel data groups in serial followed by a three-bit parallel parity group and a three-bit parallel dead space group.

A summary of the characteristics of Magnetic Drum subsystem 12 is provided in Tables A, B and C below.

TABLE A

Mechancial characteristics

Drum rotor
- Diameter—10.5 inches
- Length—9.0 inches
- Speed—7100 r.p.m.

Read/write heads
- Number per block—54
- Blocks per drum unit—9 (maximum); 8-data, 1-spare
- Track spacing (center to center)—0.0165 inch
- Tracks/inch (axially)—60.6
- Head-to-drum spacing—less than 0.0005 inch.

TABLE B

ELECTRICAL CHARACTERISTICS

| | |
|---|---|
| Recording method | Return-To-Zero |
| Recording density | 889 bits/inch |
| Bit frequency | 3.48 mc. |

TABLE C

FUNCTIONAL CHARACTERISTICS

| | |
|---|---|
| Data Handling Capabilities (Central Processor word lengths) | 30 or 36 bits |
| Storage Capacity (per drum unit) | 262,144 36-bit words/drum unit |
| Words | 2,048 36-bit words/channel |
| Bits (based on 384 tracks) | 9,437,184 |
| Bit Positions/Track | 29,358 |
| Recording Mode | Return-To-Zero |
| Address Mode | Word |
| Transfer Modes | |

| | |
|---|---|
| Drum Control Unit to Central Processor | 30- or 36-bit parallel |
| Drum Address Interface | 2-bit parallel |
| Drum Data Interface | 3-bit parallel |
| Number of Tracks | |
| Data (minimum usable) | 414 (384 active; 30 spare) |
| Reference Mark | 1 (+1 spare) |
| Word Mark | 1 (+1 spare) |
| Data Timing Tracks | 17 (10 spares for each one)[2] |
| Angular Address | 2 (+2 spares) |
| Master timing tracks | 1 (+1 spare) |
| Number of Recording Channels | |
| (minimum usable) | 128 |
| Tracks/Channel | 3 |
| Parity Checking | Odd, 3 bits/word |
| Word Transfer Rate[1] | |
| Interlace 1 | 240 Kilocycles per second (kc.) |
| Interlace 2 | 120 kc. |
| Interlace 4 | 60 kc. |
| Interlace 8 | 30 kc. |
| Interlace 16 | 15 kc. |
| Access Time | |
| Maximum | 8.5 Milliseconds (ms.) |
| Average | 4.3 ms. |
| Minimum | 300 Microseconds (μs.) |

[1]Varies with Central Processor

[2]Ten spares for each timing track is based on the maximum number of head positions that the timing track can be moved toward the center of the data block. Tracks that are not usable for timing are generally good data tracks and are used as such.

WORD-FORMATS

Six types of words, defined as follows, are utilized by the subsystem.

1. Function Word -The Function Word is a 30-bit word through which the Central Processor commands the Drum Control Unit to initiate a subsystem operation and has a format as illustrated in FIG. 9. The high-order six bits ($2^{29}$–$2^{24}$) specify the operation to be performed by the subsystem while the low-order 22 bits ($2^{21}$–$2^{0}$) specify the drum address at which the operation is to begin. The low-order 22 bits of the Function Word are held in the Word Address Register of the Control Unit and have a format as illustrated in FIG. 10. Of the low-order 22 bits; the high order bits ($2^{21}$–$2^{18}$) specify which one of the drums 0–8 that is to be utilized, the middle-order bits ($2^{17}$–$2^{11}$) specify on what channel (0–127) of the selected drum the operation is to be performed, and the low-order bits ($2^{10}$–$2^{0}$) specify the Angular Address (0–2407) on the selected channel on which the operation is to be performed.

2. Identifier Word - The Identifier Word is a 30-bit Central Processor word containing the pattern of "1"'s and "0"'s for which the subsystem must search; no specific format is specified. The Identifier Word is transferred by the Central Processor to the Control Unit as a Function Word immediately following the "command" Function Word.

3. End-of-Block Word - The End-of-Block Word is a 30-bit Central Processor word containing all "1"'s. The programmer may utilize the End-of-Block Word to separate files or records stored on the drum rotor. The End-of-Block Words may be stored at any address on the Drum Unit and are recognized by the Control Unit only during "block" operations.

4. Overflow Word - The Overflow Word is a 30-bit word having a format as illustrated in FIG. 11 and is stored at the address on the Drum Unit that immediately follows an End-of-Block Word. The Overflow Word may be used by the programmer to store the starting address of the next link in the chain of data. The Overflow Word is transmitted to the Central Processor by the Control Unit as a Status Word (op code 04) at the end of a "block" function.

5. Status Word - Status Words are 30-bit words having a format as illustrated in FIG. 12 and are generated in the Control Unit and transmitted to the Central Processor and indicate the detection and nature of special conditions in the subsystem. Status Words are transmitted to the Central Processor over the 30 data lines and are accompanied by an External Interrupt (EI) signal.

6. Data Word - Data Words are 30-bit words that contain the information that the Central Processor transmits to or receives from the Control Unit. After the operation specified by the Function Word has been received by the Control Unit and operated upon, Data Words are transferred between the Central Processor and the subsystem.

FUNCTION REPERTOIRE

Function codes are transmitted from the Central Processor to the subsystem commanding the subsystem to execute a particular operation. These function codes are contained in bit positions $2^{29}$–$2^{24}$ of the Function Word and are summarized in Table D.

TABLE D

Subsystem Instruction Repertoire

| CODE | NAME | DESCRIPTION |
|---|---|---|
| 02 | CONTINUOUS WRITE | Write data in consecutive drum addresses starting at the address specified by the Function Word. Stop when no more data is available from the Central Processor or when terminated by a Terminate Instruction Word or one of the status codes. |
| 42 | CONTINUOUS READ | Read data from consecutive drum addresses starting at the address specified by the Function Word and transfer this data to the Central Processor. Stop stop when no more data is requested by the Central Processor or when terminated by a Terminate Instruction Word or one of the status codes. |
| 52 | BLOCK READ | Read one block of data from consecutive drum addresses starting at the address specified by the Function Word and transfer this data to the Central Processor. The transfer is completed after the End-of-Block Word and one more word (Overflow Word), containing the End-of-Block status code and the five least significant characters of the Overflow Word, is transferred. Stop when transfer is completed or when terminated by a Terminate Instruction Word or one of the status codes. |
| 45 | SEARCH | After receiving the Identifier Word, read data from consecutive drum addresses starting at the address specified by the Function Word and compare each word read to the Identifier Word. When identical comparison is achieved, transfer the Search Find status code and the address of the "find" to the Central Processor. Stop when identical comparison is achieved or when terminated by a Terminate Instruction Word or one of the status codes. |
| 46 | SEARCH READ | After receiving the Identifier Word, read data from consecutive drum addresses starting at the address specified by the Function Word and compare each word read to the Identifier Word. When identical comparison is achieved continue reading and transfer the data to the Central Processor starting with the Identifier Word. Stop when |

| | | |
|---|---|---|
| | | terminated by a Terminate Instruction word or one of the status codes. |
| 55 | BLOCK SEARCH | After receiving the Identifier Word, read data from consecutive drum addresses starting at the address specified by the Function Word and compare each word to the Identifier Word. If identical comparison is achieved before an End-of-Block is read, transfer the Search Find status code along with the Address of the "find"; if the End-of-Block Word is read before the "find" is made, transfer one more word (Overflow Word) containing the End-of-Block status code and the five least significant characters of the Overflow Word. Stop after the Search Find or End-of-Block status code has been transferred to the Central Processor or when terminated by a Terminate Instruction Word or one of the status codes. |
| 56 | BLOCK SEARCH READ | After receiving the Identifier Word, read data from consecutive drum addresses starting at the address specified by the Function Word and compare each word read to the Identifier Word. If an End-of-Block is read before the "find" is made, transfer one more word containing the End-of-Block status code and the five least significant characters of the word to the Central Processor if identical comparison is achieved before the End-of-Block is read, continue reading and starting with the Identifier Word transfer the data remaining in the block to the Central Processor. Stop when the End-of-Block status code has been transferred to the Central Processor or when terminated by a Terminate Instruction Word or one of the status codes. |
| 40 | AUTOMATIC BOOTSTRAP | Perform a Continuous Read (42) from octal address 0. |
| 50 | BOOTSTRAP WITH INTERRUPT | Perform a Block Read (52) from octal address 0. |
| 23 | TERMINATE | Terminate an input operation immediately. Terminate an output operation after the last Data Word has been recorded. |
| 33 | TERMINATE WITH INTERRUPT | Same as Terminate (23) adding: send Normal Interrupt status code to the Central Processor. |

STATUS CONDITIONS

The Status Words are the means whereby the subsystem may inform the Central Processor of certain conditions that exist within the subsystem. Listed below are the Status Codes that the subsystem may generate in response to a specified status condition and transmit to the Central Processor.

1. Fault - The Fault code is generated if more than one read/write head is selected or if power to the Drum Unit is lost.

2. End-of-Block - The End-of-Block code informs the Central Processor that an End-of-Block Word (all "1"'s) has been read during a block function.

3. Search Find - The Search Find code informs the Central Processor that a specific word requested in the Search Function has been located. The low-order bits ($2^{22}$–$2^0$) of the Status Word contain the drum address of the "find."

4. Overflow Parity Error - If a parity error occurs when reading the Overflow Word (the word following the End-of-Block Word) this code is generated. The low-order bits ($2^{22}$–2) of the Status Word contain the drum address of the Overflow Word.

5. Noncontinuous Read Parity Error - This code informs the Central Processor that a parity error occurred during the noncontinuous read function. The low-order bits ($2^{21}$–$2^0$) of the Status Word contain the drum address of the erroneous word.

6. End-Of-File - End-Of-File code is generated when the next sequential address is an illegal address or is an address on an inoperable Drum Unit and, therefore, cannot be reached during the execution of the function.

7. Normal Completion - This code informs the Central Processor of normal completion of a terminate function which had requested an interrupt.

8. Illegal Function - The Illegal Function code is generated when the function code portion of the Function Word is not contained in the subsystem repertoire.

9. Illegal Address - If the Function Word contained a nonexisted address, an address of an inoperable Drum Unit, or a bootstrap address for a write function when the bootstrap area is locked out, a Status Word with the illegal address code is sent to the Central Processor. This Status Word is also generated when an error is detected in an address read from the drum Angular Address tracks, AA1 and AA2.

10. Continuous Read Parity Error - This code informs the Central Processor that a parity error occurred during the continuous read function. The word containing the error is held in the Control Unit and an Input Data Request signal will be sent to the Central Processor immediately following the acknowledgement of the interrupt. If the input buffer is active, the word containing the parity error will be transferred to the Central Processor. Data transfer then stops.

INTERFACE

Central Processor to Control Unit:

1. Data Word or External Function Word - These words are transmitted over the 30 pairs of data lines between the Central Processor and the subsystem.

2. External Function - The External Function (EF) signal indicates that the word on the data lines is an EF word.

3. Input Acknowledge - The Input Acknowledge (IA) signal indicates, through the Control Unit, that the Central Processor has accepted the Data Word or Status Word transferred to it.

4. Output Acknowledge - The Output Acknowledge (OA) signal indicates that the Central Processor has a data word ready to be transmitted to the Control Unit.

Control Unit to Central Processor:

1. Data or Status Word - Thirty pairs of data lines carry the data or Status Word from the Control Unit to the Central Processor.

2. External Interrupt - The External Interrupt (EI) signal indicates that the word on the data lines is a Status Word.

3. Input Data Request - The Input Data Request (IDR) signal informs the Central Processor that the Control Unit has a data word on the data lines.

4. Output Data Request - The Output Data Request (ODR) signal informs the Central Processor that the Control Unit is ready for operation or that it is ready for the next word during the write operation.

Control Unit to Drum Unit:

1. Write Enable Signals - These signals carry the actual data bits that are to be written on the Drum Units. Six lines are used, carrying "1"'s and "0"'s for each of the three bits that are written in parallel.

2. Write Command - In preparation for a write operation, this signal disables the read circuits and enables the write probe gate in the Drum Unit.

3. Write Probe Control - This signal is provided to inhibit the dead bit timing pulse at the inputs to the write circuits.

4. DC Voltage Fault - This signal provides data protection by disabling the write circuits.

5. Drum Select - A Drum Select signal, once acknowledged by the Drum Unit, enables communication between the Drum Unit and the Control Unit.

6. Read Margin - This enable signal is controlled by a manually operated switch in the Control Unit.

7. Select Lines - four Z lines, four Y lines, and eight X lines are used to select one of the 128 data channels (three data tracks to a channel) of a Drum Unit.

8. Interlock - This signal is provided by two lines, one input and one output. The two manually operated switches on the Drum Unit, DC Power and Lower Heads, are connected in series. If either is not in the normal position the series circuit is broken, and the Control Unit receives a disable signal.

Drum Unit to Control Unit:

1. Data Timing - This signal provides synchronization between the Drum Unit and the Control Unit.

2. Word Mark - This signal notifies the Control Unit of the beginning of a Data Word on the Drum Unit.

3. Reference Mark - This signal is supplied to the Control Unit for use as an oscilloscope trigger.

4. Angular Address - The Angular Address signals keep the Control Unit aware of the angular position of the drum rotor with respect to the read/write heads. The Angular Address signals require four lines, "1"'s and "0"'s from each of the two Angular Address tracks, AA1 and AA2.

5. Read Data - Data read from the Drum Unit is sent to the control Unit on six lines "1"'s and "0"'s from each of the three tracks making up a channel.

6. Write Fault - This signal informs the Control Unit that the Drum Unit cannot write data because of an abnormal condition.

Figure 13:
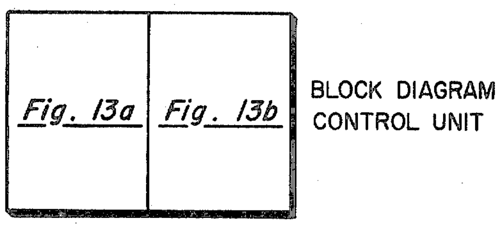
FIG. 13 is a block diagram of the arrangement of FIGS. 13*a* and 13*b*.
Figures 14, 14A:
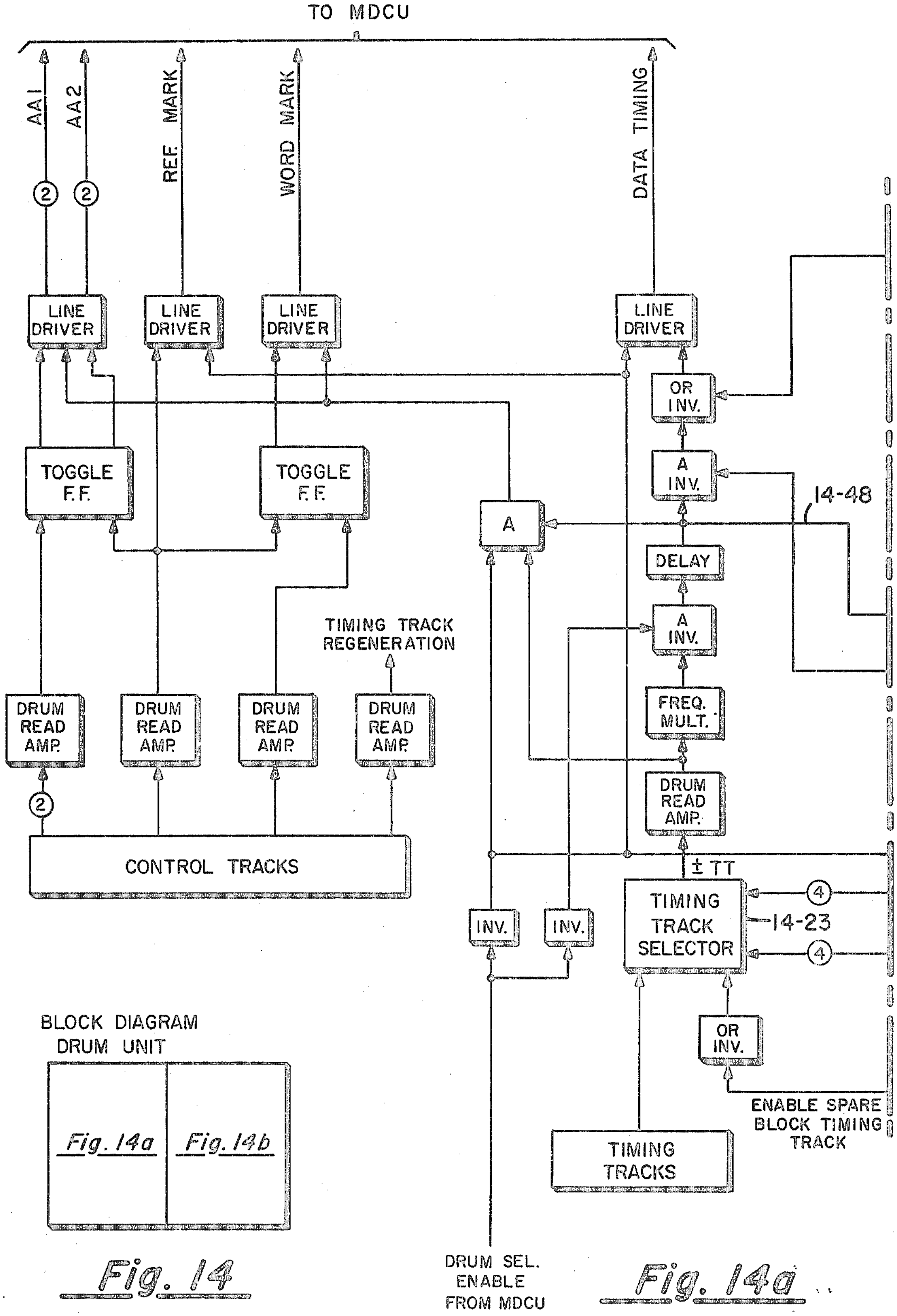
FIG. 14 is a block diagram of the arrangement of FIGS. 14*a* and 14*b*.
FIGS. 14*a* and 14*b* are block diagrams of the drum unit.

With particular reference to FIG. 13 and FIG. 14 there are presented simplified block diagrams of the Magnetic Drum Control Unit 14, also referred to as the Control Unit, and the Magnetic Drum Unit 16, also referred to as the Drum Unit, respectively. All data flow between the Control Unit and the Drum Unit is, as previously described, processed in three-bit parallel groups, or characters, identified as data bits $2^0$, $2^1$, $2^2$. Each data bit is carried by two parallel conductors coupling the associated read/write head in the Drum Unit to the Data Shift Register (DSR) 13–20 in the Control Unit. Current flows in either of such conductors, in a first conductor representative of a "1" or in the second conductor representative of a "0 ", Considering a positive going pulse as being representative 5 of a "1" and of a "0," a positive going pulse on a data line $2^0 \cdot 2^1$, $2^2$ represents a "1" while a positive going pulse on a data line $\underline{2}^0$, $\underline{2}^1$, $2^2$ represents a "0." Such data bits are read from or written on the three track formed channels on the drum rotor as specified by the associated angular address. Data to and from the Central Processor are in the form of 30-bit words via the data lines. Note: as stated above Magnetic Drum Subsystem 12 is capable of operating on 30- or 36-bit words, but only the 30-bit word format is utilized in the discussion of the present invention.

All data flow between the Control Unit and the Drum Unit is routed through the Data Shift Register (DSR) 13–20. Briefly, during an output operation data flow from the Central Processor, through the input amplifiers 13–21 into DSR Rank A. From Rank A, data are transferred to Rank B and from there to a shift register, DSR Rank S of Rank S and T. Data are then transmitted in a serial/parallel manner through Rank S via lines 13–22 to the Drum Unit. As soon as the contents of Rank A are "emptied" into Rank B, Rank A is then considered as being "empty" and an Output Data Request (ODR) signal is transmitted to the Central Processor. During an input operation data flows through Input Amplifiers 13–23 in a serial 13–23 parallel manner into the shift register, Rank S. The contents of Rank S are then transferred through Rank A to Rank B. When Rank B is loaded an Input Data Request (IDR) signal is transmitted to the Central Processsor. As an aid in understanding the flow of information through the drawings of the present invention, lines of data signal flow are presented by heavy black lines while lines of control signal flow are identified as lighter weight lines.

Writing on Magnetic Drum Unit 16 is commanded by the Central Processor via an External Function (EF) signal on a control line therebetween, which EF signal gates an Instruction Word into Rank A of the Data Shift Register. The high-order six bits, bits $2^{29}$–$2^{24}$, of the Instruction Word are gated into the Function Code Translator 13–24 and I/O Control Circuitry 13–25 to condition the necessary circuits for a write function. The low-order 22bits, bits $2^{21}$–$2^{0}$, of the Instruction Word are routed to the Word Address Register 13–26 to indicate the address of the drum unit at which the writing operation is to begin. This portion of the Instruction Word (see FIG. 10, which portion includes the binary data defining the selected drum unit, the selected channel on the selected drum unit and the selected data word on the selected channel) is transferred to the XYZ Translator 13–28 which outputs XYZ enable signals on one line of each of the $X^0$–$X^7$, $Y^0$–$Y^3$, and $Z^0$–$Z^3$ groups of XYZ enable lines. The XYZ enable signals are utilized by the Drum Unit to select the specified data channel and the associated timing track on the drum rotor —see FIG. 14. This Word Address Register 13–26 is automatically advanced during a normal information transfer operation. During each revolution of the drum rotor the angular address tracks, AA1 and AA2 and the Angular Address Register Q/R 13–30 are monitoring the rotational angle of the drum rotor. Then, depending upon the interlace of addresses routed by the Interlace Selector 13–32 circuitry, the actual angular address is registered in the Angular Address Compare circuitry 13–34. When the comparison to the Instruction Word Address is identical, a signal is provided on line 13–36, and the writing operation can begin. For a discussion of a typical interlace operation see the above mentioned A. R. Talarczyk patent application.

The Central Processor after transmitting the Instruction Word and the EF signal has sent the subsystem the first word of data to be written on the drum rotor which first word of data was accompanied by an Output Acknowledge (OA) signal. This sequence of operation puts a 30-bit word into the Data Shift Register 13–20 Rank A from where it is routed to Ranks B, S, and T. When the specified Angular Address is reached, I/O Control 13–25 circuitry gates clock pulses to shift the data word in Rank T leftwise and out, serially, into the three parallel data lines $2^0$, $2^1 \cdot 2^2$ that are routed to the drum unit via lines 13–22. The Parity Register 13–38 monitors each of the lines 13–22; at the end of the transmission, the content of the Parity Register 13–38 is routed to the Drum Unit. Various types of error signals may be transmitted to the Status Code Translator 13–40 circuitry; in certain cases, the content of the Word Address Register 13–26 might also be a part of the Status Word.

Reading from the Drum Unit is commanded by the Central Processor when it transmits an Instruction Word to the Control Unit which Instruction Word specifies the address at which the reading operation is to begin. When Angular Address identity is registered, I/O Control 13–25 circuitry gates character pulses, i.e., bits $2^0$, $2^1$, $2^2$, to shift the serial data from the three selected $2^0$, $2^1$, $2^2$ read lines into third-segments of Rank S of the Data Shift Register 13–20. After 12 clock pulses, one clock pulse representing a transmission of each three-bit parallel group, or character, from the data word on the drum rotor—see FIG. 7 and 8, Rank S contains a full Central Processor word, the bits of which word are then routed in parallel through Ranks T, A and B to the Central Processor via lines 13–42. The word register count is automatically advanced by the Word Mark signal received on lines 13–44 upon completion of the readout of the full word from the specified data address.

When the Central Processor commands a Search Function, the complete address at which the read address is to begin is not specified, but an Identifier Word is specified. The first word after the Function Word is the Identifier Word in any bit configuration. The Identifier Word is routed to Rank B where it is stored for comparison and directed on cable 13–46 as one set of inputs to the Search Compare Gates 13–48. The reading process then begins, shifting Drum Unit data into Ranks S and T, to form a word. Each completed word is routed to Rank A, where it is stored during the comparison operation and directed on cable 13–50 as the other set of inputs to the Search Compare Gates 13–48. The Central Processor word and the Drum Unit word are checked for identity in the Search Compare Gates 13–48 in the well-known manner. Each time a complete Drum Unit Word is brought into the Control Unit from the Drum Unit, but which complete Drum Unit word does not match the Identifier Word, the count in the Word Address Register 13–26 is advanced, and another complete Drum Unit word is brought in from the Drum Unit for comparison to the Identifier Word. When identity is achieved, i.e., when the contents of Rank A equal the contents of Rank B (A=B), a signal is provided on line 13–52 for causing I/O Control 13–25 to initiate a normal read operation for the rest of the drum data during the search read or the block search read operation; during search or block search operations the occurrence of the " find" is transmitted to the Central Processor by the Control Unit.

The I/O Control 13–25 circuitry detects the End-of-Block Word (all "1"'s) when the End-of-Block Word is read off the drum rotor; the timing signal for a shift of the data from Rank T to the next higher order Rank S combines with the absence of zeros on the Drum Unit's read lines to indicate the End-of-Block signal. The End-of-File condition is detected when I/O Control 13–25 circuitry advances the Word Address Register 13–26 one count beyond the highest Angular Address, but the next count is for a Drum Unit or a channel that cannot be addressed. This prohibition exists if a Search find has occurred on the last Angular Address, or the write process has been completed, or the last word read from the Drum Unit has reached Rank B of the Data Shift Register 13–20.

During a normal output data transfer operation the Control Unit transmits an Output Data Request (ODR) signal on line 13–58 to the Central Processor, indicating to the Central Processor that the Control Unit is in a condition to accept a flow of data from the Central Processor. This ODR signal is necessary as data flow from the Central Processor to the Control Unit is available for a fixed time only. The Central Processor, when it responds to the Control Unit's ODR signal, transmits an OA signal on line 13–60 to the Control Unit after placing data on the data lines. The Control Unit must sample the data lines within a fixed time period after receipt of the OA signal. Another ODR signal will not be recognized by the Central Processor until a fixed time period has transpired.

In review, then, the Central Processor, when it wishes to activate the Magnetic Drum Subsystem, transmits one or more Instruction Words to the Control Unit commanding the Control Unit to initiate a read, write or search operation. While performing the specified operation, the Control Unit checks parity, notifies the Central Processor of any abnormal conditions, and keeps the Central Processor informed of the status of the operation. The information listed above under the paragraph headings, Word Formats, Function Repetoire, Status Conditions, and Interface provides a more detailed analysis of the flow of data signals and control signals within and between Magnetic Drum Control Unit 14 and Magnetic Drum Unit 16 of Magnetic Drum Subsystem 12.

As stated above the Word Address Register 13–26 in the Control Unit contains the low-order 22 bits, bits $2^{21}$–$2^{0}$, of the Instruction Word as received from the Central Processor. Such portion of the Instruction Word includes the channel select bits, bits $2^{17}$–$2^{11}$, that define the to-be-selected channel and the Angular Address select bits, bits $2^{10}$–$2^{0}$, that define the to-be-selected data word on such selected channel where the specified operation is to commence. The channel select bits in the Word Address Register 13–26 are, in turn, coupled to the XYZ Translator 13–28 via lines 13–62. Between the XYZ Translator 13–28 of FIG. 13 and the Channel Selector 14–20 of FIG. 14 there are provided: a group of eight X enable lines, $X^0$–$X^7$; a group of four Y enable lines, $Y^0$–$Y^3$; and, a group of four Z enable lines, $Z^0$–$Z^3$. The channel select portion, bits $2^{17}$–$2^{11}$, of the Instruction Word is translated by the XYZ Translator 13–28 coupling an enable signal to one line of each of the three groups of XYZ enable lines whereby the specified channel on the drum rotor is selected through drumhead switches on the data blocks, which drumhead switches are included in the Channel Selector 14–20 of FIG. 14, which will be described in more detail below.

Such groups of XYZ enable lines are, as stated above, routed to the Channel Selector 14–20. With one line of each group of XYZ enable lines enabled there is selected one channel on the drum rotor that is defined by the one group of three read/write heads on a data block as determined by the channel select portion of the Word Address Register 13–26. The selected data word on the selected data channel, in turn, is determined by the Angular Address portion of such Word Address Register 13–26.

If during the checkout of the drum unit a "bad-track" is located on the drum rotor under one of the data blocks 2–9, the two conductors coupling the data block's drumhead switch to the data head that is associated with this previously determined bad-track may be decoupled therefrom and transferred and physically coupled to a spare head, of the same data block, that is associated with a "goo" spare track. As there are provided four spare heads in each data block, up to four bad-tracks under each data block may be replaced by the provided four spare heads. However, if more than four bad-tracks are located under one data block such additional bad-tracks must be replaced by spare tracks under the spare heads in the spare block 1. As each group of three heads that defines a data channel is to be in the same block and as the data channel and the associated timing tack are to be in the same block, it is necessary, when replacing data heads in a data block by data heads in the spare block 1, to transfer such data block heads in groups of three and to also transfer the timing thereof to the timing track head in the spare block 1.

Although the transfer, or the replacement, of a data channel from under a data block to under the spare block 1 is accomplished by the physical rewiring of the data block's drumhead switch from the data block's no-longer-used three data heads to he spare block's replacing three data heads, the concurrent transfer to the spare block's timing track head must be accomplished by electronic switching means. Such electronic switching means includes the Bad-Track Memory 14–22 and the Timing Track Selector 14–23 of FIG. 14. After the replacement of a data channel under a data block by a data channel under the spare block 1, the XYZ enable lines that were associated with the no-longer-used data block's data heads are coupled to the Bad-Track Memory 14–22 via lines 14–24 whereby whenever such XYZ enable lines are enabled the timing circuitry is electrically decoupled from the timing track that is associated with the no-longer-used data block's data heads and is electrically coupled to the spare block's timing track head. Thus, the spatial relationship of the data channel and its associated timing track is maintained by having both under the spare block 1.

Data flow from the drum rotor, shown as Data Tracks 14–26, to the Control Unit during a read operation is controlled by the Channel Selector 14–20, as determined by the XYZ enable signals on the $X^0$–$X^7$, $Y^0$–$Y^3$, and $Z^0$–$Z^3$ enable lines. Such XYZ enable signals select a group of three heads on one of the data blocks 2–9. The read data from such three selected data heads, on two lines per head with one line required from a for a "1" and a second line required for a "0," pass through the necessary Drum Read Amplifier 14–28 and Read Gates 14–30 and from the Read Driver 14–32 are coupled to the Control Unit over the read data lines $2^0$, $2^1$, $2^2$. During read operations a Write Lockout 14–34 circuit provides a write lockout signal on line 14–36 to AND-circuit 14–38. This directs the read data on lines 14–40 to Drum Read Amplifiers 14–28.

Data flow from the Control Unit to the drum rotor during a write operation is controlled by the Channel Selector as in the read operation. The write data enters the Drum Unit on the write data lines $2^0$, $2^1$, $2^2$ at an Input Amplifier 14–42. From the Input Amplifier 14–42 the write data is coupled to the Drum Write Amplifier 14–44 in which it is gated by the Write Control Circuit 14–46 and the associated timing track signal received on line 14–48. During write operations the Write Lockout 14–34 circuit removes the lockout signal and enables AND-circuit 14–38 thereby passing the write data from cable 14–50 onto cable 14–52 and into the channel Selector 14–20. The write data, when gated out in time with the timing track signal, passes through the Channel Selector to the selected group of three data heads on one of the data blocks 2–9. With such group of three selected data heads the data is written on the drum rotor on the data channel at the Angular Address as specified by the Control Unit's Word Address Register 13–26.

Figures 15, 16:
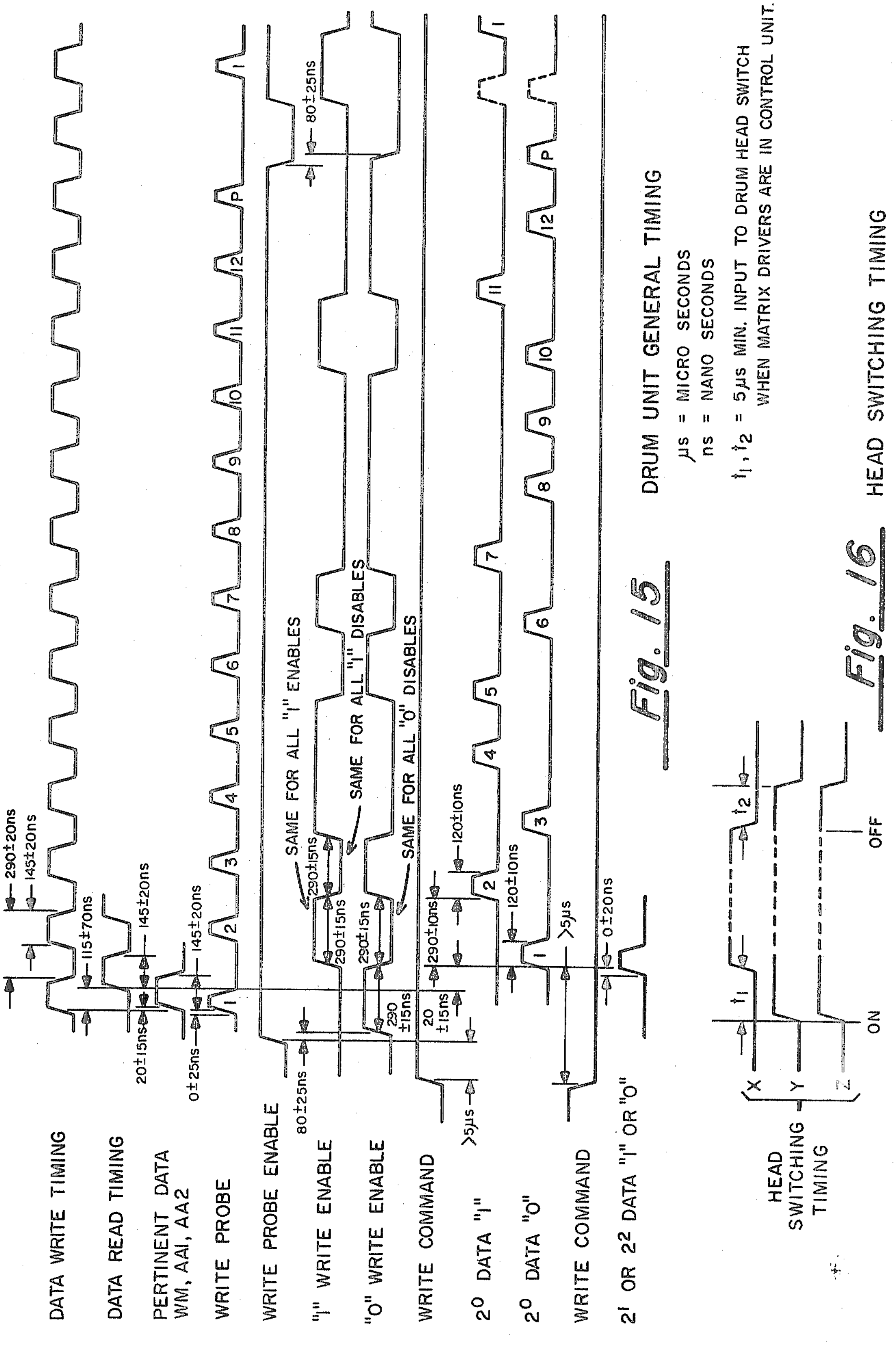
FIG. 15 is an illustration of the drum unit general timing diagram.
FIG. 16 is an illustration of the drum unit head-switching timing diagram.

With particular reference to FIG. 15 and 16 there are illustrated typical timing relationships of the various signals within Magnetic Drum Subsystem 12 whereby such subsystem will effect reliable operation. During a normal input data transfer the Input Data Request (IDR) signal is maintained by the Drum Control Unit on line 13–54 until an Input Acknowledge (IA) signal is received from the Central Processor on line 13–56. The IA signal is transmitted for a fixed time duration only and upon the Drum Control Unit's sensing of the IA signal its IDR signal is terminated.

Figure 17A:
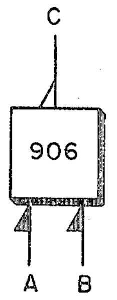
FIG. 17*a* is an illustration of the block diagram and truth table of the positive OR inverter circuit utilized in FIGS. 18*b* and 18*c*.
Figure 17B:
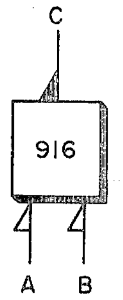
FIG. 17*b* is an illustration of the block diagram and truth table of the positive AND inverter circuit utilized in FIGS. 18*b* and 18*c*.

FIGS. 17*a* and 17*b* illustrate the logic circuit types that are to be utilized in the description of the illustrated embodiment of the present invention and their associated truth tables. These circuits are well-known and are commercially available, and, accordingly, shall not be described in detail since this would not add to an understanding of the present invention. It is, of course, understood that other types of logic configurations could be utilized in implementing the present invention; those shown herein have been found to be advantageous both with regard to cost and operation values. In the description of the operation of the illustrated embodiment certain logic conventions shall be assumed. In this regard an open arrow shall be considered to be equivalent to a –4.5-volt signal which shall be equivalent to a logical "0" and representative of a negative signal while a closed arrow shall be equivalent to a ground signal which shall be equivalent to a logical "1" and representative of a positive signal.

Figures 18, 18A:
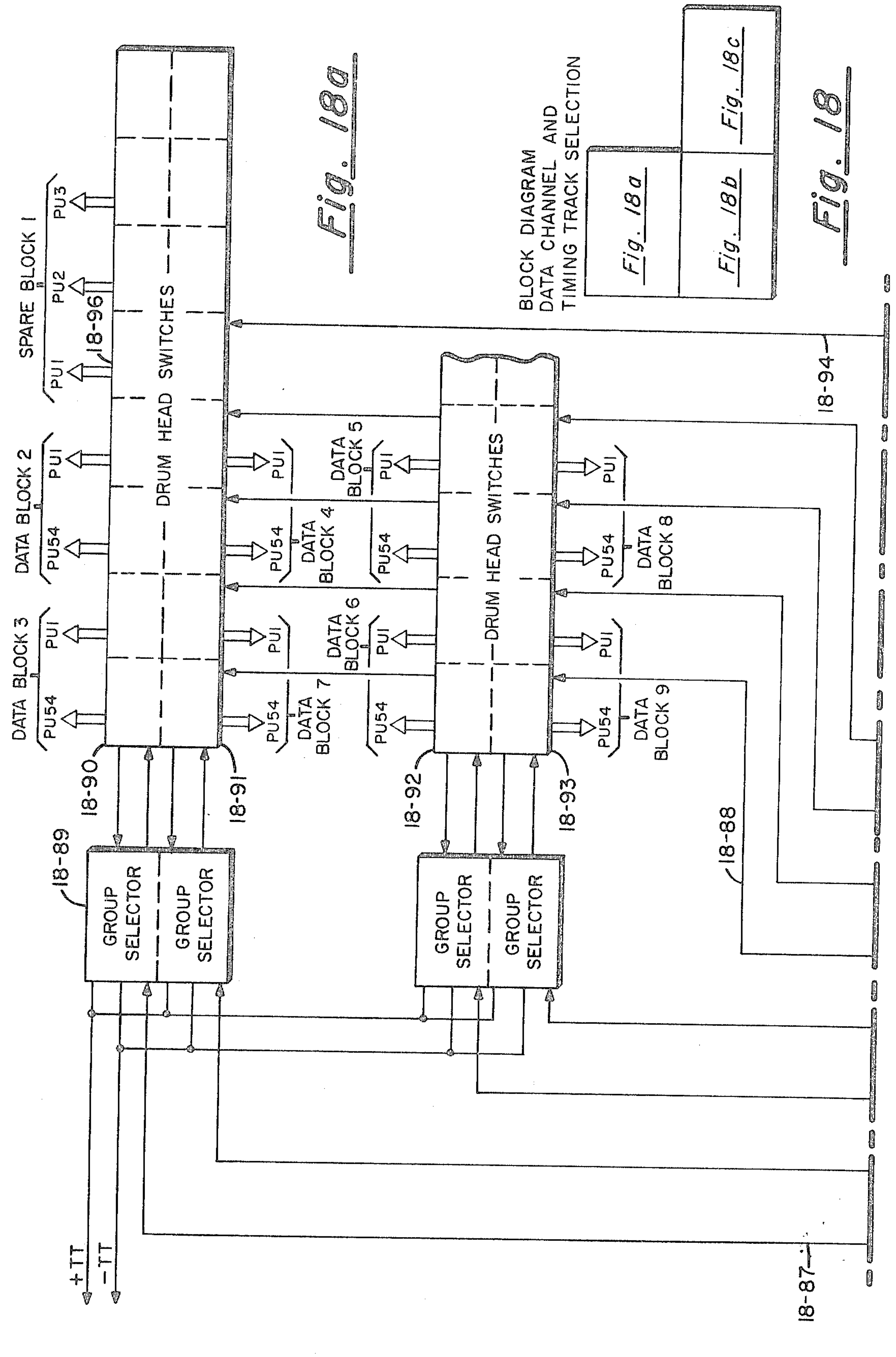
FIG. 18 is a block diagram of the arrangement of FIGS. 18*a*, 18*b* and 18*c*.
FIGS. 18*a*, 18*b* and 18*c* are block diagrams of the data channel and timing track selection circuitry.
Figure 18B:
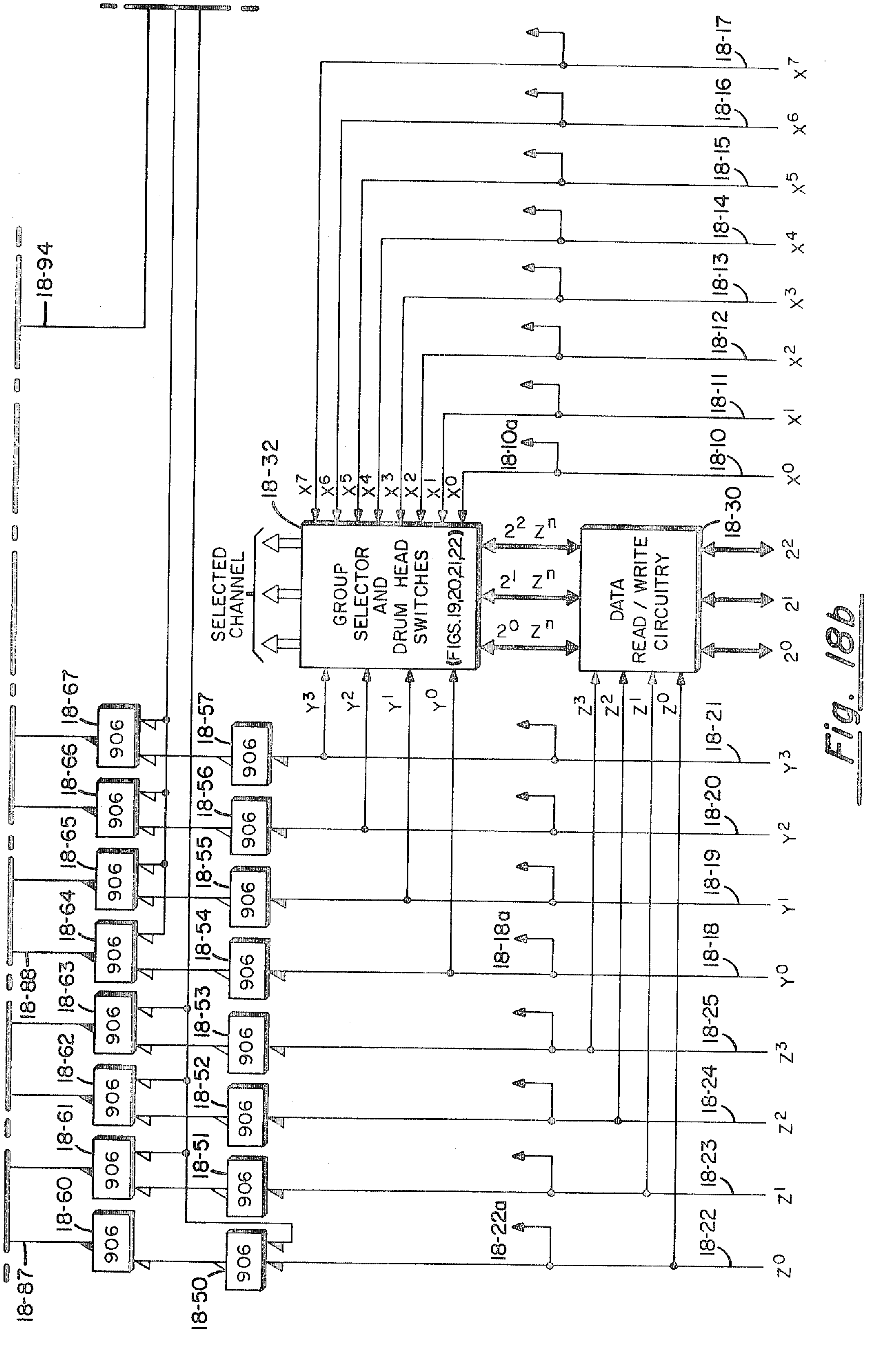
Figure 18C:
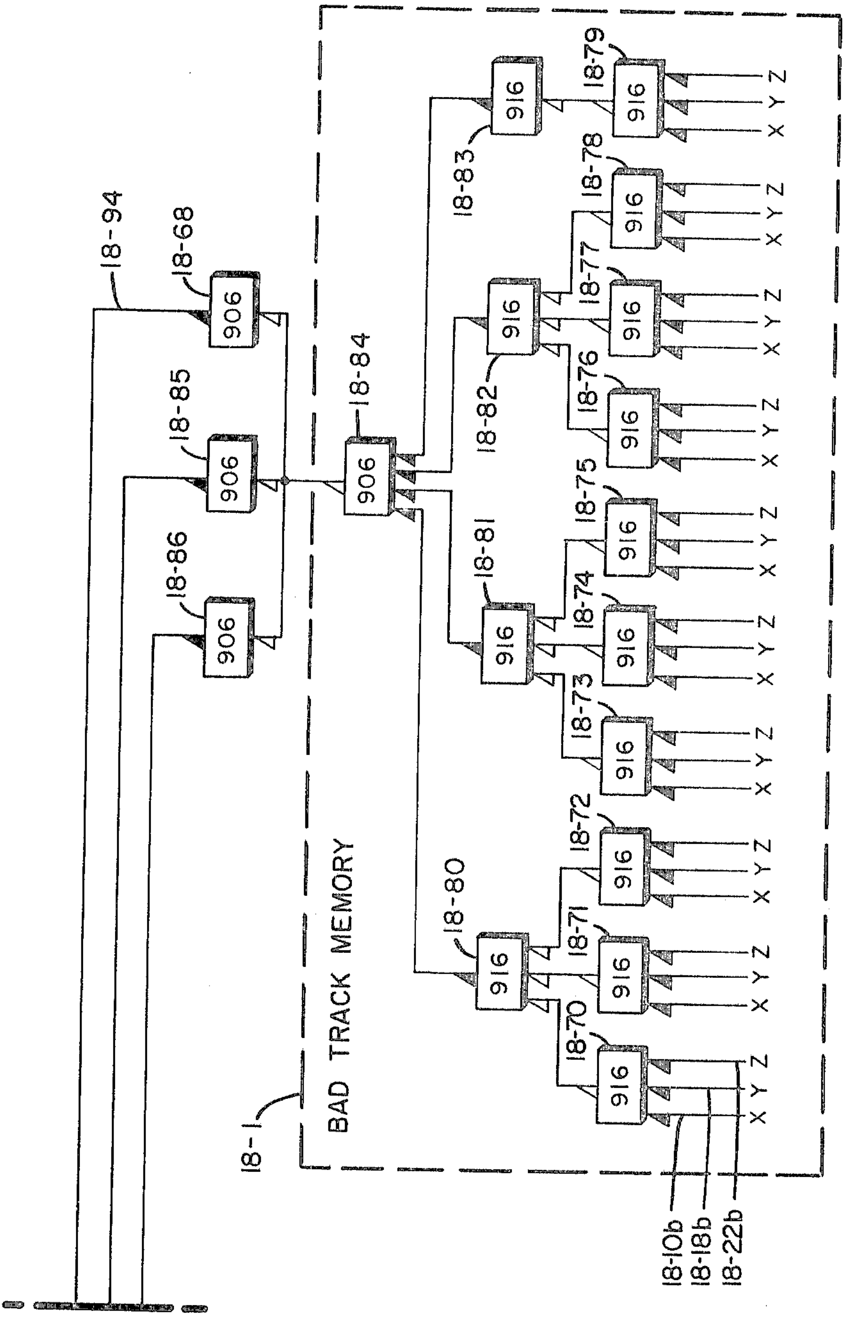
Figure 19:
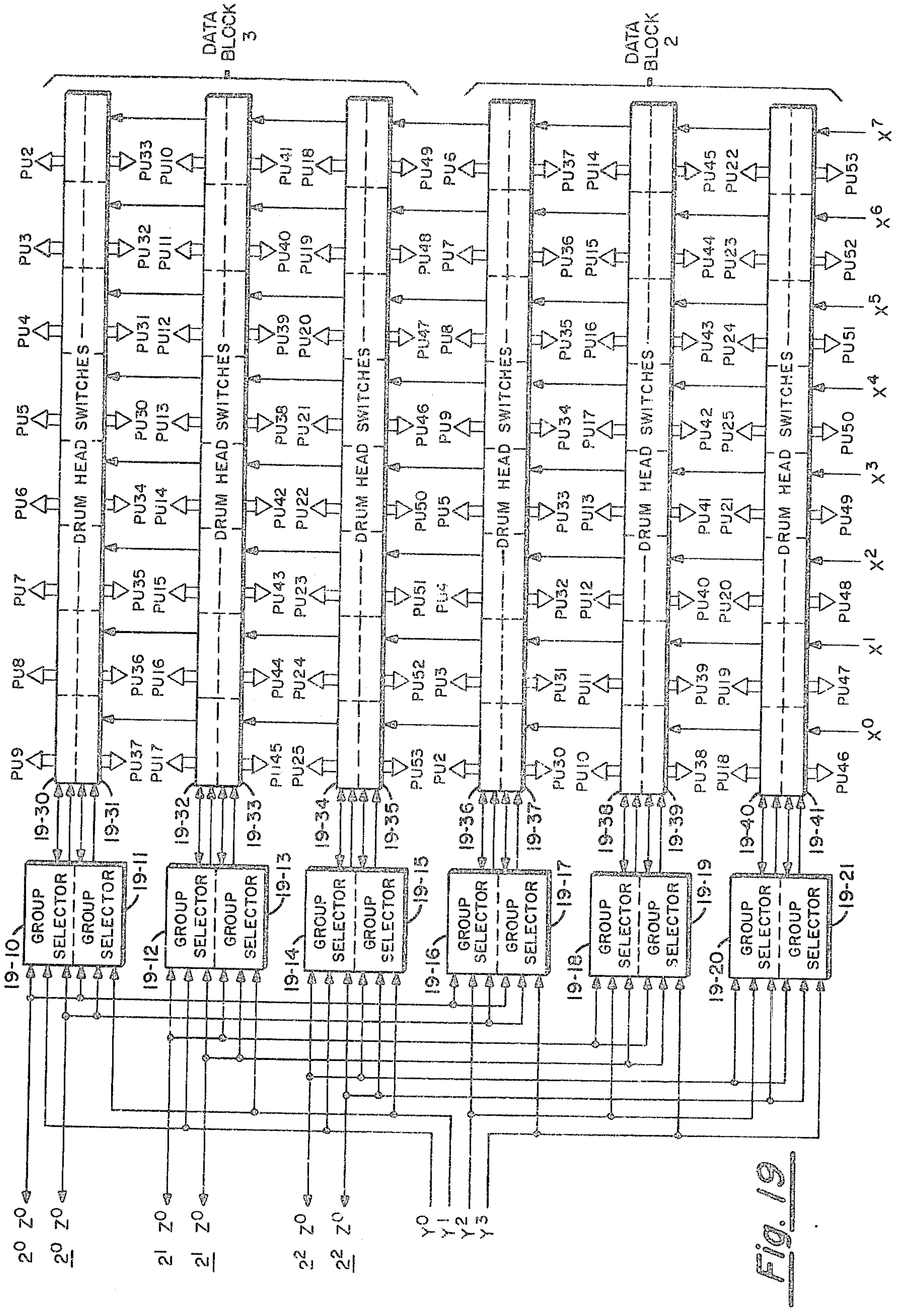

FIGS. 18*a*, 18*b* and 18*c*, when laid out according to FIG. 18, illustrate, in detail, that portion of the Drum Unit that particularly relates to the selection of the selected channel and the related timing track heads PU1, PU54 of data blocks 2–9 and timing track head PU1 of spare block 1. With particular reference to FIG. 18*c* there is illustrated in detail the logic of the Bad-Track Memory 14–23 of FIG. 14*b* and illustrated in dashed block 18–1, whereby when the selected data channel is to be read out from under spare block 1 the timing track heads in data blocks 2–9 are disabled and the timing track head in spare block 1 is enabled as is required by the present invention.

Initially, the illustrated embodiment of the present invention shall be described in its operation whereby the selected data channel is under one of data blocks 2–9. Subsequently, the operation of the illustrated embodiment of the present invention shall be described when the selected data channel lies under spare block 1 and when it is necessary to transfer the timing thereof from the timing track head in data block 2–9 to the timing track head in spare block 1. Under both operating conditions the XYZ enable lines 18–10–18–25 from the XYZ Translator 13–28 of FIG. 13*b* are coupled to the control circuitry of FIG. 18*b* whereby the enabling of one enable line of each group of XYZ enable lines selects three heads on one of data blocks 2–9. However, in these cases when it has been previously determined that bad-track lies under one of the selected data heads on one of data blocks 2–9 the wires coupling the selected drumhead switches to the associated heads are physically decoupled from such associated heads and by means of three pairs of electrical conductors are coupled to three spare data heads in spare block 1 which three heads define an effective data channel. Accordingly, data channel selection is, in all cases, achieved through the same selection circuitry.

With particular reference to FIGS. 19 through 22 there are illustrated diagrams of the group selector and drumhead switches for the Z selects $Z^0$, $Z^1$, $Z^2$, $Z^3$, respectively. With particular reference to FIG. 23 there are illustrated the spare data heads PU23–PU52 of spare block 1. Note that there are no group selector or drumhead switches associated with the spare data heads of spare block 1, for, as previously mentioned, such spare data heads are not selected by the XYZ selection circuitry but are selected by the physical wiring thereto from the otherwise-selected data heads over a defective data channel in one of data blocks 2–9. Note that spare block 1 has 30 spare data heads forming 10 groups of three spare data heads per group which 10 groups of three spare data heads are related to the 10 groups of XYZ enable lines associated with the Bad-Track Memory 13–1 of FIG. 18*c*.

An operation of the Drum Unit is, as previously discussed, initiated by the insertion of an Instruction Word in the Word Address Register 13–26 of the Control Unit —see FIG. 13*b*. The low-order 22 bits, bits $2^{21}$–$2^0$, of the Instruction word are coupled to the XYZ Translator 13–28 which couples one X enable, one Y enable and one Z enable signal to the associated XYZ enable lines. These XYZ enable lines are, in the Drum Unit, coupled to selection circuitry which selects the particular data channel that is associated with the particular XYZ enable combination. With particular reference to FIG. 18*b* these YZ enable lines 18—18–18–25 are coupled to the timing track selection circuitry of FIG. 18*a* while the XYZ enable lines 18–10–18–25 are coupled to the Data Read/Write Circuitry 18–30 and the Group Selector and Drumhead Switches 18–32 for the selection of the particular data channel. For purposes of the present discussion the Data Read/Write Circuitry 18–30 and the Group Selector and Drumhead Switches 18–32 of FIG. 18*b* may be considered to be analogous to the Channel Selector 14–20 of FIG. 14*b* while the timing track head selection circuitry of FIG. 18*a* may be considered to be analogous to the Timing Track Selector 14–23 of FIG. 14*a*.

Figure 13A:
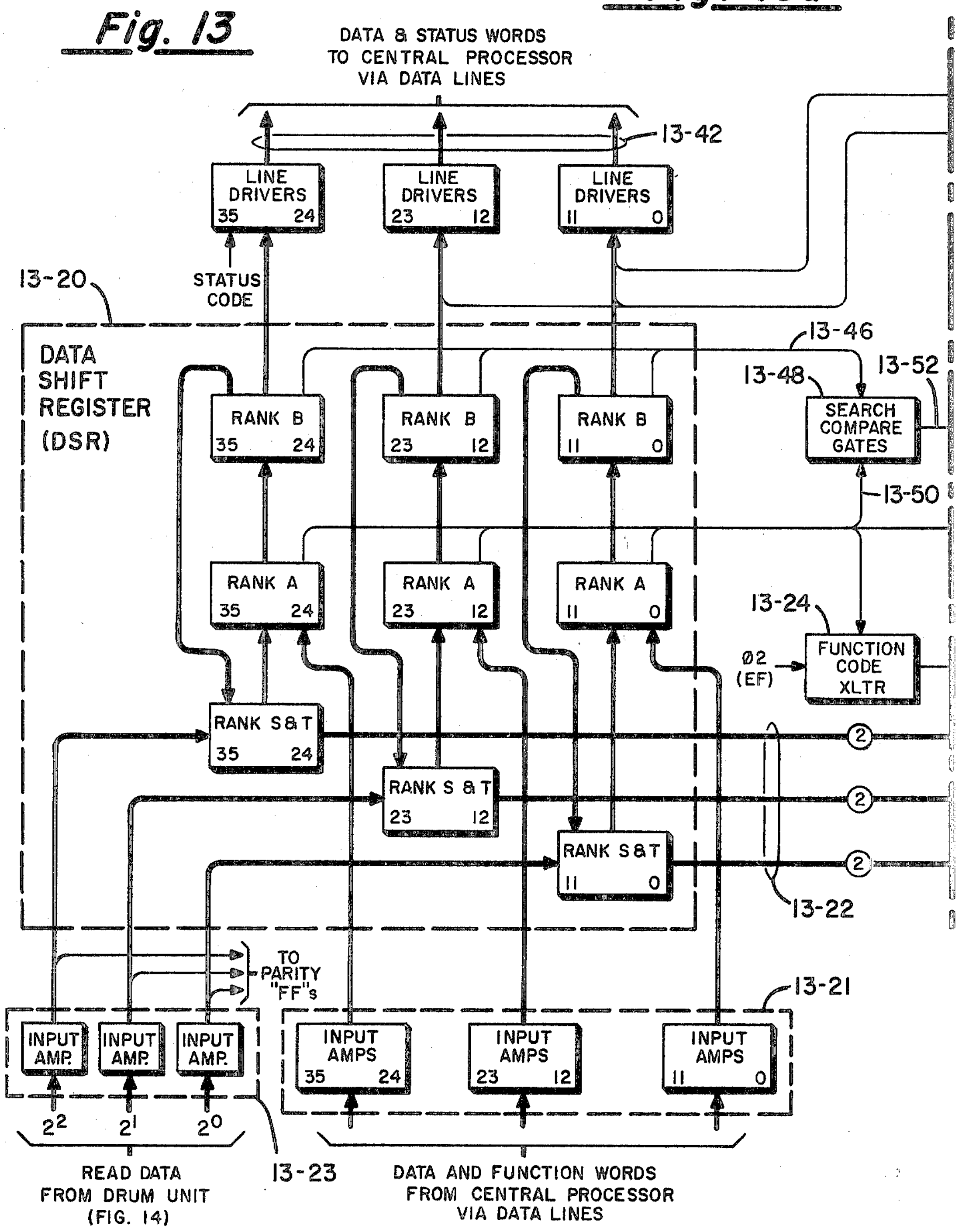
FIGS. 13*a* and 13*b* are block diagrams of the control unit.
Figure 13B:
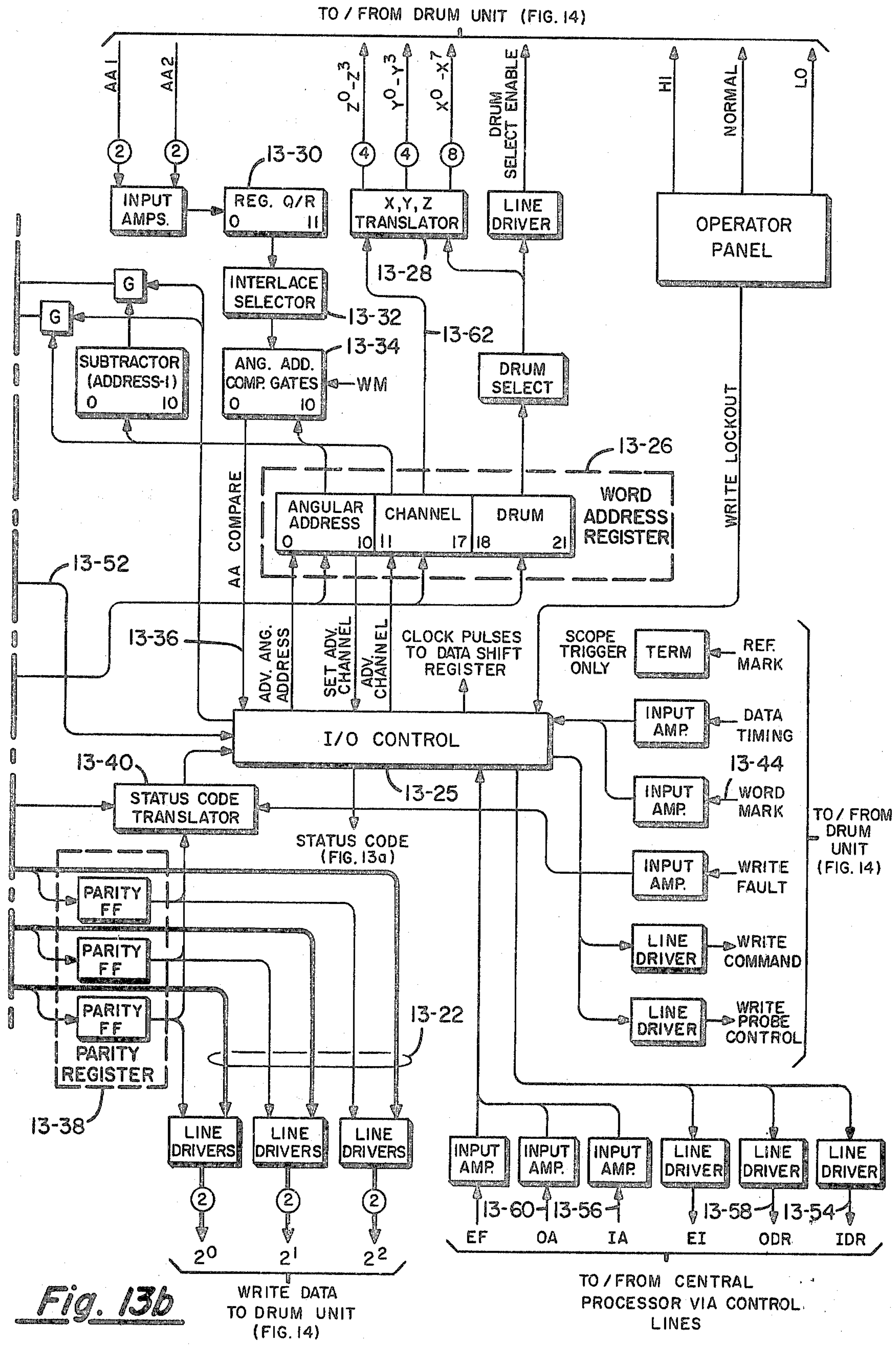
Figure 14B:
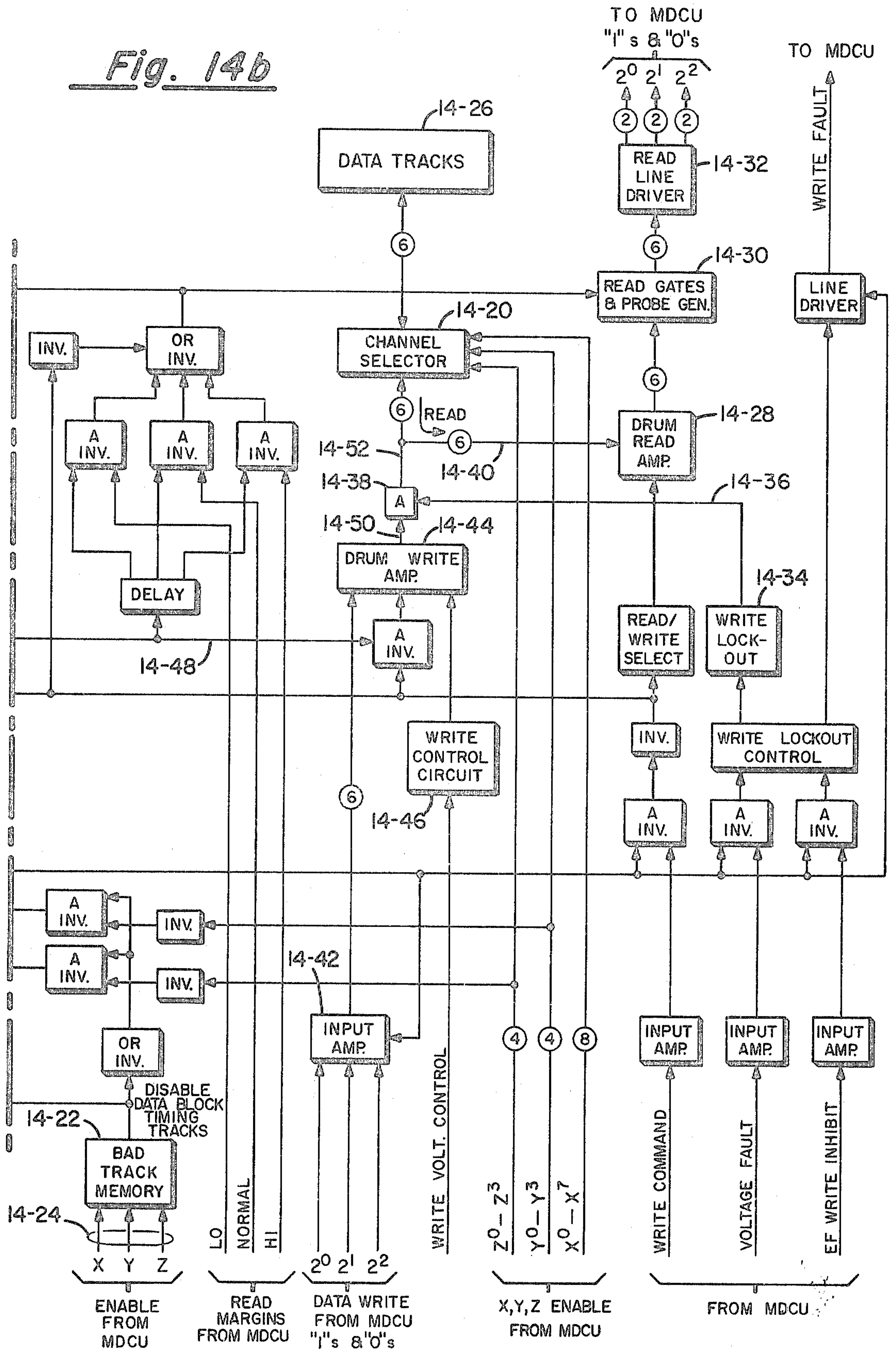

Data flow between the Control Unit of FIGS. 13*a* and 13*b* and the drum unit of FIGS. 14*a* and 14*b*, is as previously described, over data lines $2^0$, $2^1$, $2^2$ (and $\underline{2}^0\underline{2}^1$, $\underline{2}^2$) into what may be considered Data Read/Write Circuitry 18–30 wherein the data is switched to one of four sets of data block groups selector and drumhead switches as determined by the enable signal on one of the four $Z^n$ enable lines $Z^0$, $Z^1$, $Z^2$, or $Z^3$. According to the particular $Z^n$ enable signal that is coupled to the Data Read/Write Circuitry 18–30, only one of the sets of group selector and drumhead switches of FIGS. 19, 20, 21 or 22 is coupled to data lines $2^0$, $2^1$, $2^2$. These enable data lines $2^0$, $2^1$, $2^2$, at their associated group selector and drumhead switches, are effectively gated by the associated $Y^n$ and $Z^n$ enable signals into only three heads on one data block forming a data channel; one head associated with data $2^0$, a second head associated with data $2^1$ and a third head associated with data $2^2$. As an example of this assume that XYZ enable lines $X^0$, $Y^0$ and $Z^0$ enable lines have an enable signal coupled thereto by the XYZ Translator 13–28 of FIG. 13*b*. An examination of FIGS. 19, 20, 21 and 22 indicates that the group selector and drumhead switches of FIG. 19 relating to data blocks 2 and 3, would be selected by the $Z^0$ enable signal coupled to the Data Read/Write Circuitry 18–30 whereby the data $2^0Z^0$, $2^1Z^0$, $2^2Z^0$ would be coupled to the group selector head switches at data blocks 2 and 3. Concurrently, the $Y^0$ enable signal would be coupled to group selector head switches 19–10, 19–12 and 19–14 of data block 3 while the $X^0$ enable signal would be coupled to the leftmost drumhead switches 19–30–19–41 of data blocks 2 and 3. Accordingly, data blocks 3, head PU9 would be coupled to data $2^0Z^0$; data block 3, head PU17 would be coupled to data $2^1Z^0$; and, data block 3, head PU25 would be coupled to data $2^2Z^0$. Further, it is apparent upon inspection of FIGS. 19–22 that any particular combination of XYZ enable signals would select an associated group of three heads on any one data block 2–9.

As previously described applicants' invention includes as one of its features a data block having the read/write configuration of FIG. 3 in which there is included a first and a second timing track head, PU1 and PU54, second and first groups of data track heads, PU2–PU25 and PU30–PU53, and a group of spare track heads, PU26–PU29. It has been further previously stated that in order to achieve the optimum relationship of the data heads and the associated timing track head to minimize skew and crosstalk error timing track head PU1 is associated with data track heads PU30–PU53 while timing track head PU54 is associated with data track heads PU2–PU25. Accordingly, as the XYZ enable signals have selected heads PU9, PU17 and PU25 of data block 3 it is apparent that PU54 of data block 3 must be selected for the timing of such three head formed related data channel. FIGS. 18*a*, 18*b* and 18*c* illustrate the manner whereby data block 3 head PU54 is selected as the timing track head for data heads PU9, PU17 and PU25 of data block 3.

For purposes of the present discussion assume that an enable signal on any of the XYZ enable lines shall be described as a "0" or a "1" represented by an open arrow or a closed arrow whereby a "1" shall indicate the presence of an enable signal while a "0" shall represent the absence of an enable signal, i.e., a disable signal. Under this convention, with the example previously selected whereby the $X^0$, $Y^0 \cdot Z^0$ enable lines are enabled, $Z^0$ enable line 18–22 and $Y^0$ enable line 18—18 couple "1" signals to their associated positive OR inverter circuits 18–50 and 18–54 —see FIG. 18*a*—while $Z^1$, $Z^2$, $Z^3$, $Y^1$, $Y^2$, $Y^3$ enable lines 18–23 –18–25 and 18–19–18–21 couple a "0" to their associated positive OR inverter circuits 18–51–18–53 and 18–55–18–57. Accordingly, only positive OR inverter circuits 18–60 and 18–64 have a "0" coupled to their input from their associated YZ enable lines while positive OR inverter circuits 18–61 –18–63 and 18–65–18–67 have a "1" coupled to their input from their associated YZ enable lines.

With none of the XYZ enable lines that are associated with the positive AND inverter circuits 18–70–18–79 of Bad-Track Memory 18–1 having all "1"'s coupled thereto, positive OR inverter circuit 18–84 has a "0 " at its output causing both positive OR inverter circuits 18–85 and 18–86 to emit "1," which "1"'s are in turn coupled to their associated positive OR inverter circuits 18–64–18–67 and 18–50 and 18–61 –18–63, respectively, while positive OR inverter circuit 18–84 couples a "0" to the input of its associated positive OR inverter circuit 18–68. Accordingly, under these logical conditions only positive OR inverter circuits 18–60 and 18–64 have a "1" emitted therefrom and coupled to their associated ZY enable lines 18–87 and 18–88 which are, in turn, coupled to the group selector head switch 18–89 and drumhead switches 18–90–18–93, respectively, of FIG. 18*a* while all other such positive OR inverter circuits 18–61–18–63 and 18–65–18–67 have a "0" coupled to their outputs. With $Z^0$ enable line 18–87 coupling a "1" to its respectively associated group selector head switch 18–89 and with $Y^0$ enable line 18–88 coupling a "1" to its respectively associated drumhead switches 18–90–18–93 timing track head PU54 of data block 3 has been selected as was previously discussed. Accordingly, it has been shown that by providing an enable signal on one of eight X enable lines, $X^0$–$X^7$, on one of four Y enable lines $Y^0$–$Y^3$ and on one of four Z enable lines $Z^0$–$Z^3$ there has been selected three associated heads on a data block, forming a data channel, and the associated timing track head on the same data block providing timing for the data read from or written on the selected data channel.

As a further example of the operation of the illustrated embodiment of applicants' invention assume that the same Instruction Word, as utilized with the previous example of operation of the Drum Unit, is retained in the Word Address Register 13–26 of FIG. 13*b* whereby, through the XYZ Translator 13–28, the same XYZ enable lines are enabled; i.e., $X^0$, $Y^0$, $Z^0$ enable lines have an enable signal equivalent to a "1" coupled thereto while all other XYZ enable lines have a disable signal equivalent to a "0" coupled thereto. Accordingly, as in the discussion of the previous example, the $Z^0$ enable line 18–22 at the Data Read/Write Circuitry 18–30 will couple data $2^0$, $2^1$, $2^2$ to the group selector head switches of data blocks 2 and 3 of FIG. 19. As before, the enabled $X^0$, $Y^0$ enable lines at the Group Selector and Drumhead Switches 18–32 would couple data $2^0$, $2^1$, $2^2$ to heads PU9, PU17 and PU25, respectively, of data block 3. However, assume that during the checkout of the drum unit a "bad-track" was located on the drum rotor under head PU9 of data block 3. Accordingly, if such had been the case and if insufficient spare heads, heads PU26–PU29, remain on data block 3, the two wires coupling each of the drumhead switches 19–10 ,19–12 and 19–14 to the associated heads PU9, PU17 and PU25 would have been decoupled form such heads PU9, PU17 and PU25 and coupled to, e.g., PU23, PU33 and PU43 of spare block 1—see FIG. 24. Accordingly, although the particular XYZ enable signals $X^0$, $Y^0$, $Z^0$ would have normally selected heads PU9, PU17, PU25 of data block 3 such XYZ enable signals now select heads PU23, PU33 and PU43 of spare block 1. Thus, the selection of the data channel as defined by the data heads on the spare block 1 is effectively identical to that of the selection of the data channel under the data blocks.

However, the selection of the timing track head, PU54, must now be transferred from that of the selected data block, i.e., data block 3, to spare block 1 to which the selected data channel has been transferred. This switching, or selection, of the timing track from under the data block to under the spare block is achieved by the circuitry associated with the Bad-Track Memory 18–1 of FIG. 18*c*. As in the previous example, the coupling of a "1" enable signal to $Z^0$ and $Y^0$ enable lines 18–22 and 18–18, respectively, has caused positive OR inverter circuits 18–50 and 18–54 to couple "0"'s to the input of their associated positive OR inverter circuits 18–60 and 18–64 while positive OR inverter circuits 18–51–18–53 and 18–44–18–57 couple "1"'s to their associated positive OR inverter circuits 18–61–18–63 and 18–65–18–67. However, upon the determination of the bad-track under head PU9 of data block 3 and the resulting coupling of the associated drumhead switches 19–30, 19–32 and 19–34 of data block 3 to heads PU23, PU33, PU43 of spare block 1, $X^0$, $Y^0$ and $Z^0$ enable lines 18–10*a*, 18–18*a* and 18–22*a* are coupled to the inputs 18–10*b*, 18–18*b* an 18–22*b* of positive AND inverter circuit 18–70. With the "1" enable signals coupled to the X, Y, Z inputs of positive AND inverter circuit 18–70, positive AND inverter circuit 18–70 emits a "0" which "0" is coupled to one of the inputs of positive AND inverter circuit 18–80 which circuit is caused to emit a "1" therefrom and which "1" is, in turn, coupled to one of the inputs of positive OR inverter circuit 18–84. The coupling of a "1" to one of the inputs of positive OR inverter circuit 18–84 causes a "0" to be coupled to the input of positive OR inverter circuits 18–85 and 18–86. Positive OR inverter circuits 18–85 and 18–86 are then, in turn, caused to couple a "1" to their associated positive OR inverter circuits 18–64–18–67 and 18–61–18–63 which cause such positive OR inverter circuits 18–61–18–67 to couple a "0" to their associated output lines regardless of the nature of the inputs from the associated positive OR inverter circuits 18–51–18–57. Positive OR inverter circuit 18–86 also couples a "1" to the input of positive OR inverter circuit 18–50 which forces positive OR inverter circuit 18–50 to couple a "0" to the input of positive OR inverter circuit 18–60. Positive OR inverter circuit 18–60, in turn, couples a "1" to the $Z^0$ output enable line 18–87 selecting group selector 18–89 and the associated drumhead switches.

Thus, the coupling of a "0" to any one of the inputs of positive OR inverter circuits 18–61–18–67 performs the function of an inhibit signal, it inhibiting the coupling of a "1" to the group selector head switches and drumhead switches of FIG. 18*a* that are associated with the YZ output enable lines from the positive OR circuits 18–61–18–67. This "inhibiting" action of Bad-Track Memory 18–1 effectively switches off the timing track heads, PU1, PU54, of data blocks 2–9. Simultaneously, however, positive OR inverter circuit 18–68 couples a "1" to its associated output enable line 18–94 which line in conjunction with line 18–87 at drumhead switch 18–96 activates timing track head PU1 of spare block 1. Accordingly, by the coupling of the $X^0 Y^0$, $Z^0$ enable lines 18–10$a$, 18–18$a$ and 18–22$a$ (which lines are associated with the heads PU9, PU17, PU25 on data block 3, which head PU9 included a bad-track and which thus required the coupling of their drumhead switches to spare heads PU23, PU33, PU43 of spare block 1) to a set of X, Y, Z enable lines 18–10$b$, 18–18$b$ and 18–22$b$ in the Bad-Track Memory 18–1 the timing track heads PU1, PU54 of data blocks 2–9 have been disabled and the timing track head PU1 of spare block 1 has been enabled.

With particular reference to FIG. 24 there is illustrated the manner in which the selected data channel is transferred from under heads PU9, PU17 and PU25 of data block 3 to under heads PU23, PU33 and PU43 of spare block 1. As stated above, upon the determination that a bad-track existed under data block 3 head PU9 and that it was therefore necessary to replace data block 3 head PU9 and the associated heads PU17 and PU25, the two wires coupling each of the associated drumhead switches 19–30, 19–32 and 19–34 were decoupled therefrom and coupled to the replacing heads PU23, PU33 and PU43 of spare block 1. To accomplish this transfer; wires 24–10 and 24–11 were added to couple drumhead switch 19–30 on data block 3 to head PU23 on spare block 1, wires 24–12 and 24–13 were added to couple drumhead switch 19–32 data block 3 to head PU33 on spare block 1, and wires 24–14 and 24–15 were added to couple drumhead switch 19–34 on data block 3 to head PU43 on spare block 1. With this rewiring the $X^0 Y^0$, $Z^0$ enable signals now select spare block 1 heads PU23, PU33 and PU43 as described above.

It is apparent therefore that applicants' illustrated embodiment has presented a preferred embodiment of applicants' invention wherein both data and timing may be switched from a data block to a spare block when the use of certain heads on the data block is precluded by a bad track. Thus, it is apparent that there has been described and illustrated herein a preferred embodiment of the present invention that provides a novel dynamic memory system.

Having, now, fully illustrated and described our invention, what we claim to be new and desire to protect by Letters Patent is set forth in the appended claims:

1. The method of optimizing skew and crosstalk error in a dynamic memory system, comprising:

forming an integral data block of rigidly associated first and second timing track heads and rigidly associated first and second groups of data track heads, respectively;

arranging the first timing track head and the second timing track head of the data block at opposite ends of the data block;

arranging the first group of data track heads adjacent the second timing track head and the second group of data track heads adjacent the first timing track head;

arranging the first and second timing track heads and the associated first and second groups of data track heads, respectively, of the data block to be inductively associated with a cylindrical dynamic magnetizable recording surface for defining associated first and second timing tracks and associated first and second groups of data tracks on said recording surface;

controlling the first timing track head in the data block for selectively timing the reading from and the writing on said recording surface by its associated first group of data track heads; and, controlling the second timing track head in the data block for selectively timing the reading from and the writing on said recording surface by its associated second group of data track heads.

2. The method in claim 1 further comprising:

forming an integral spare block of a rigidly associated spare timing track head and a plurality of rigidly associated spare data track heads;

arranging the spare timing track head and the plurality of associated spare data track heads of the spare block to be inductively associated with said recording surface for defining an associated spare timing track and a plurality of associated spare data tracks on said recording surface; and, switching the reading from and the writing on said recording surface from the first timing track head and the associated first group of data track heads in the data block to the spare timing track head and the associated spare data track heads in the spare block whenever one of the data tracks defined by the switched-from data track head in the switched-from data block is associated with a bad-track on said recording surface.

3. The method of claim 2 further comprising:

switching the reading from and the writing on said recording surface from the second timing track head and the associated second group of data track heads in the data block to the spare timing track head and the associated spare data track heads in the spare block whenever one of the data tracks defined by the switched-from data track head in the switched-from data block is associated with a bad track on said recording surface.

4. The method of claim 3 further comprising:

forming said data block with an additional plurality of rigidly associated spare heads; and arranging the additional plurality of spare heads intermediate the first and second groups of data track heads and inductively coupled to said recording surface for defining associated spare tracks on said recording surface.

5. The method of claim 4 further comprising:

controlling the first or second timing track heads in said data block for selectively timing the reading from and the writing on said recording surface by said additional plurality of spare heads.

6. The method of optimizing skew and crosstalk error in a dynamic memory system, comprising:

forming an integral data block including a rigidly associated first timing track head and a plurality of first associated data track heads;

arranging the first timing track head and the plurality of first associated data track heads of the data block to be inductively associated with a first timing track and a plurality of first associated data tracks on a cylindrical dynamic magnetizable recording surface;

forming an integral spare block including a rigidly associated spare timing track head and a plurality of associated spare data track heads;

arranging the spare timing track head and the plurality of associated spare data track heads of the spare block to be inductively associated with a spare timing track and a plurality of associated spare data tracks on said recording surface;

coupling read/write conductor means to said first associated data track heads;

controlling said first timing track head for selectively timing the reading from and the writing on said recording surface by said first associated data track heads;

testing the first timing track and the plurality of first associated data tracks on said recording surface for an associated bad track;

locating a bad-track among said first associated data tracks;

decoupling said read/write conductor means from said first associated data track heads that are associated with said bad-track and coupling said decoupled read/write conductor means to said associated spare track heads; and, switching the timing of the reading from and the writing on said recording surface from the first timing track head to the spare timing track head whenever the reading from and the writing on said recording surface is performed by said associated spare data track heads.

7. A dynamic memory system comprising:

a dynamic cylindrical magnetizable recording surface capable of having a bad-track thereon;

a data block having a plurality of rigidly coupled read/write heads that are inductively associated with said recording surface;

said read/write heads including first and second timing track heads and associated first and second groups of data track heads, respectively;

said first and second groups of data track heads positioned intermediate and adjacent to said data block's second and first timing track heads, respectively;

a plurality of timing tracks and data tracks along said recording surface, each track under and defined by an associated one of said read/write heads;

means for controlling said data block's first timing track head to provide timing for said data block's first group of data tracks heads and for controlling said data block's second timing track head to provide timing for said data block's second group of data track heads.

8. A dynamic memory system, comprising:

a dynamic drum rotor having a magnetizable recording surface capable of having a bad-track thereon;

first and second head blocks, each of said head blocks having a plurality of rigidly aligned read/write heads that are inductively associated with said recording surface;

said read/write heads in said first head block including first and second timing track heads, and associated first and second groups of data track heads, respectively;

said first and second groups of data track heads positioned intermediate and adjacent to said second and first timing track heads, respectively;

first means for causing said first head block's first timing track head to provide timing for its first group of associated data track heads and for causing said first head block's second timing track head to provide timing for its second group of associated data track heads;

said read write heads in said second head block including a group of data track heads and an associated timing track head;

second means for causing said second head block's timing track head to provide timing for its group of associated data track heads; and control means including said first and second means for selectively reading from or writing with said second head block instead of said first head block when a read/write head in said first head block is inductively associated with a bad-track.

9. A dynamic memory system including:

a dynamic drum rotor having a magnetizable recording surface;

said recording surface capable of including at least one bad-spot;

a plurality of head blocks, each of said head blocks having a plurality of rigidly associated timing, data and spare track heads inductively associated with said recording surface;

said head blocks comprising a plurality of data blocks and at least one spare block;

means for causing relative motion between said plurality of head blocks and said recording surface;

a plurality of timing tracks, data tracks and spare tracks along said recording surface, each track under and defined by an associated one of said heads, said data track heads arranged in groups of $n$ heads, where $n$ is an integer greater than 1, in said data blocks and in said spare block for forming on said recording surface associated data channels of $n$ data tracks each;

control means for selecting one of said data channels that is associated with a selected one of said data blocks for reading from or writing onto said selected data channel on said recording surface;

means for coupling said control means to a data channel under said spare block when said selected data channel under said otherwise selected data block has been determined to include a bad-spot; and, switching means for switching to a timing track under said spare block from a timing track under said otherwise selected data block when reading from or writing onto the data channel under said spare block.

10. The system of claim 9 wherein each of said data blocks includes first and second timing track heads, first and second groups of $n$ data track heads and a group of spare track heads.

11. The system of claim 10 wherein each of said first and second timing track heads is positioned at the opposite end of its data block;

said first and second groups of $n$ data track heads are positioned adjacent said second and first timing track heads, respectively; and said group of spare track heads is positioned intermediate said first and second groups of $n$ data track heads.

12. A dynamic memory system, comprising:

a dynamic drum rotor having a magnetizable recording surface capable of having at least one bad-track;

a plurality of head blocks, each of said head blocks having a plurality of rigidly aligned read/write heads that are inductively associated with said recording surface;

said plurality of head blocks comprising a plurality of data blocks and at least one spare block;

each of said data blocks having first and second timing track heads position at opposite ends of its data block, and associated first and second groups of data track heads, respectively;

the first and second groups of data track heads in each of said data blocks positioned adjacent said second and first timing track heads, respectively, and intermediate thereto;

first means for causing each of said data a block's first timing track head to provide timing for its associated first group of data track heads and for causing each of said data block's second timing track head to provide timing for said data block's associated second group of data track heads;

said spare block including a third group of data track heads and an associated third timing track head;

second means for causing said third timing track head to provide timing for said third group of data track heads; and control means including said first and second means for selectively timing the reading from or the writing with said third group of data track heads by said associated third timing track head when a bad-track is determined to be associated with an otherwise-selected data track head of said first or second groups.

* * * * *